United States Patent [19]

Ikeda et al.

[11] Patent Number: 5,123,282
[45] Date of Patent: Jun. 23, 1992

[54] VIBRATING TYPE PRESSURE MEASURING DEVICE

[75] Inventors: Kyoichi Ikeda; Tetsuya Watanabe; Takahiro Kudo; Akio Fujita; Hideo Tsukamoto; Nobuaki Kohno; Hideaki Kuwayama, all of Tokyo, Japan

[73] Assignee: Yokogawa Electric Corporation, Tokyo, Japan

[21] Appl. No.: 694,709

[22] Filed: May 2, 1991

[30] Foreign Application Priority Data

| | | | |
|---|---|---|---|
| May 10, 1990 | [JP] | Japan | 2-120987 |
| May 11, 1990 | [JP] | Japan | 2-121489 |
| May 14, 1990 | [JP] | Japan | 2-123791 |
| Jul. 10, 1990 | [JP] | Japan | 2-182064 |
| Mar. 29, 1991 | [JP] | Japan | 3-19823 |

[51] Int. Cl.⁵ .................... G01L 7/08; G01L 11/00
[52] U.S. Cl. ............................ 73/704; 73/778; 73/862.59; 310/338
[58] Field of Search ............. 73/702, 704, 717, 723, 73/DIG. 4, 862.59, 778; 310/338

[56] References Cited

U.S. PATENT DOCUMENTS

| | | | |
|---|---|---|---|
| 4,813,271 | 3/1989 | Greenwood | 73/702 |
| 5,009,108 | 4/1991 | Harada et al. | 73/704 |
| 5,060,526 | 10/1991 | Barth et al. | 73/702 |

Primary Examiner—Donald O. Woodiel
Attorney, Agent, or Firm—Moonray Kojima

[57] ABSTRACT

A vibrating type pressure measuring device having good shock wave proof measuring characteristics, high frequency response, good temperature characteristics, and can be readily miniaturized, wherein pressure to be measured is applied to a silicon diaphragm provided in an internal vacant space of a housing, and a magnetic field is applied by a DC current magnetic field applying device to a vibrator beam arranged in the inside of the diaphragm, with a gap therebetween kept in vacuum, and fixed to the diaphragm at both ends, and detects the changes in natural frequency of the vibrator beam caused by the pressure to be measured. The diaphragm and/or vibrator beam are constructed so one or the other or both have rough or uneven surfaces so as to prevent any adhesion therebetween.

6 Claims, 22 Drawing Sheets

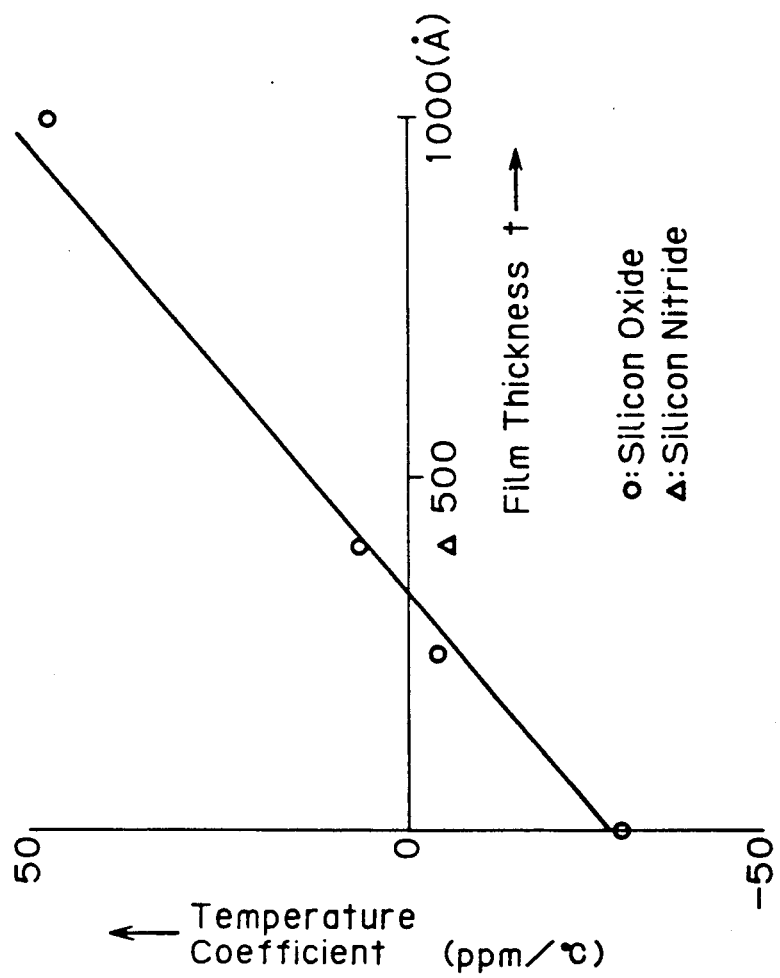

VIBRATING TYPE PRESSURE MEASURING DEVICE

BACKGROUND OF THE INVENTION

1. Field of Invention

This invention relates to a vibrating type pressure measuring device, wherein the natural vibrating frequency of a vibrator beam is changed according to the force applied thereto; and more particularly, to improvements in such a device.

2 Description of the Prior Art

FIGS. 1 to 4 are diagrams for explaining a conventional vibrating type pressure measuring device, such as, for example, disclosed in U.S. Pat. No. 4,841,775, wherein FIG. 2 depicts an enlargement of part A of FIG. 1 with a vibration detecting circuit connected thereto; FIG. 3 depicts section A-A of FIG. 2; and FIG. 4 depicts an electrical equivalent circuit of FIG. 2.

Turning to FIG. 1, the pressure measuring device comprises a substrate 10 of a silicon single crystal of D conduction type, wherein the upper surface has a crystalline plane (100), for example, of impurity concentration of less than $10^{15}$ atoms/cm$^3$. On one surface of substrate 10, there is formed a diaphragm 11 which is engraved by etching from the back surface of a thin thickness.

The thick part 12 in the circumferential part of diaphragm is adhered to a pedestal 14 having a pressure conducting hole 13 in the center. Pedestal 14 is adhered to a pressure conducting pipe 15 in such a manner as to communicate to pressure conducting hole 13. Pressure P to be measured is introduced into pressure conducting pipe 15.

On the surface of the side not subjected to the above-described etching of diaphragm 11, shown with symbol A, there is partially formed an n$^+$ diffusion layer (shown in abridged form in the figure) of an impurity concentration of about $10^{17}$, and on one part of the n$^+$ diffusion layer, is formed vibrator 16 in the direction of crystal axis <001> (see FIG. 2). In vibrator 16, the n$^+$ layer and the D layer are processed by photolithography and underetching.

A magnet 17 is provided in a non-contact state and perpendicularly to vibrator 16 at about the central upper part of vibrator 16. An SiO$_2$ film 18 is provided as an insulating film (see FIG. 3).

Metal electrodes 19$a$, 19$b$, such as of aluminum, are provided. A terminal of electrode 19$a$ is connected to the n$^+$ layer elongated from vibrator 16 through a contact hole 20$a$ provided via the SiO$_2$ layer. Another terminal of electrode 19$a$ is connected to a terminal of a comparative resistance R$_c$, which has approximately equal resistance value to that of vibrator 16, and to the input terminal of an amplifier 21, respectively. The output terminal of amplifier 21, from which output signals are obtained, is connected to a terminal of primary coil L$_1$ of a transformer 22. Another terminal of coil L$_1$ is connected to common.

On the other hand, another terminal of comparative resistance R$_c$ is connected to a terminal of secondary coil L$_2$ of transformer 22. The midpoint of secondary coil L$_2$ is connected to common. Another terminal of secondary coil L$_2$ is connected to a terminal of electrode 19$b$ formed on another terminal of vibrator 16 via contact hole 20$b$ of the n$^+$ layer.

When reverse vias is applied between the D type layer (i.e. substrate 10) and the n$^+$ type layer (i.e. vibrator 16) to insulate them, and DC current i is passed to vibrator 16, although the impedance increases in the resonance state of vibrator beam 16, the equivalent circuit shown in FIG. 4 is obtained when the impedance at this time is denoted as R.

Thus, since a bridge is formed with secondary coil L$_2$, in which the midpoint C$_o$ is connected to common, the comparative resistance R$_c$, and the impedance R, the non-equalibrium signals of this bridge are detected by amplifier 21. When the output of amplifier 21 is positive, the output is returned to primary coil L$_1$, and the system generates self exciting vibrations at the natural frequency of vibrator 16.

The impedance R of vibrator beam 16 increases at the natural frequency. Impedance R is represented by the following:

$$R = (1/222)\cdot(1/(Eg\gamma)^{1/8})\cdot(AB^2l^2/bh^2)\cdot Q + R_d$$

wherein,
E = elasticity
g = gravitational acceleration, $\gamma$ = density of material constituting the vibrator,
A = a constant determined by the vibrating mode,
B = magnetic flux density,
l = length of vibrating beam,
b = width of vibrating beam,
h = thickness of vibrator beam,
Q = sharpness of resonance, and
R$_d$ = DC resistance value.

According to the above equation, since Q of vibrator 16 takes the value of several hundred to several tens of thousands, large vibration signals can be obtained as the output of amplifier 21 in the resonance state. As described, when the vibrating type transducer is constituted in such a manner that it carries out positive return by taking the gain of the amplifier 21 sufficiently large, the system carries out self exciting vibration at the natural frequency.

The vibrator may be one using p type material, for example, by diffusing boron into an n type silicon substrate for more than $4 \times 10^{19}$ atoms/cm$^3$ and by means of selective etching.

However, disadvantageously, in the device, when the resonance frequency of the diaphragm is in the performance frequency range of vibrator 16, and overlaps the resonance frequency of vibrator 16, such as by the change of pressure, lock-in is generated thereby to deteriorate the linearity, or hysteresis is generated.

Also, for measuring shock-like pressure, a squeeze R must be provided in pressure conducting hole 13 and a suitable time constant must be provided by adjusting the volume C of the pressure measuring chamber around the silicon diaphragm 11 so that destruction of silicon diaphragm 11 by the shock-like pressure, is prevented The word "squeeze" describes an absorber.

In general, since diaphragm 11 has resonance characteristics, it is designed in such a manner as hereinafter described.

First, FIG. 5 depicts the frequency characteristics of silicon diaphragm 11, wherein the ordinate represents dB and the abscissa represents frequency. The symbol f$_o$ denotes the resonance frequency of silicon diaphragm 11, and the symbol G$_o$ denotes the amplitude ratio at the resonance point.

Then, FIG. 6 depicts the frequency characteristics of the pressure conducting line, wherein the ordinate represents dB and the abscissa represents frequency. Symbol $f_c$ denotes the shut down frequency of the pressure conducting line, and symbol $G_L$ denotes the amplitude ratio. C the symbol C denotes the volume, and the symbol R denotes the squeeze. The total of the frequency characteristics are shown in FIG. 7.

The pressure conducting line frequency characteristics are preferably designed so that $G_o + G_L \leq 0$ dB. In this case, (1) The shut down frequency $f_c$ of the pressure conducting line becomes low, and the frequency response deteriorates; (2) A large squeeze R becomes necessary; and (3) The capacity C must be made large, and the temperature characteristics deteriorate.

Due to such circumstances, miniaturization of prior art devices becomes difficult.

The terminology "pressure measuring apparatus using vibratable wire" refers to a device for detecting the vibration frequency of the vibrator, and for detecting the frequency output as a digital output. Since it is a digital output, it has high resolution and high S/N ratio. However, since such prior art vibrators are made of metal, they have the defective property of generating drift and hysteresis.

SUMMARY OF THE INVENTION

An object of the invention is to overcome the aforementioned and other deficiencies and disadvantages of the prior art.

Other objects are to provide a vibrating type pressure measuring device, which as good linearity, hysteresis, and is inexpensive; and which has good shock wave proof measuring characteristics, good temperature characteristics, and is easily miniaturized.

BRIEF DESCRIPTION OF THE DRAWING

FIG. 60 is a diagram for explaining the performance of the embodiment of FIG. 52.

DETAILED DESCRIPTION OF PREFERRED EMBODIMENTS

Figure 8:
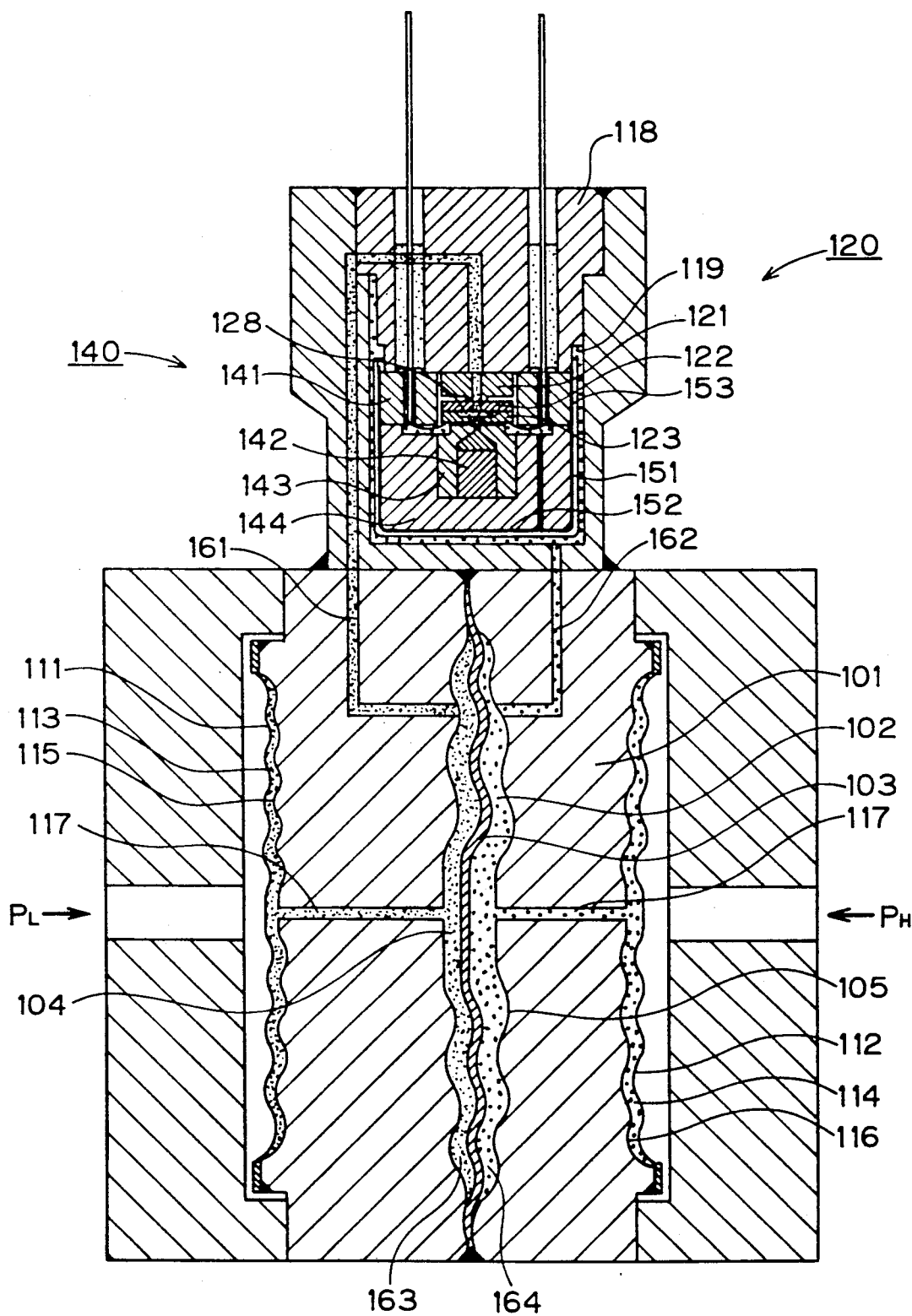
FIGS. 8, 9, 10 are sectional diagrams depicting an illustrative embodiment of the invention.
Figure 9:
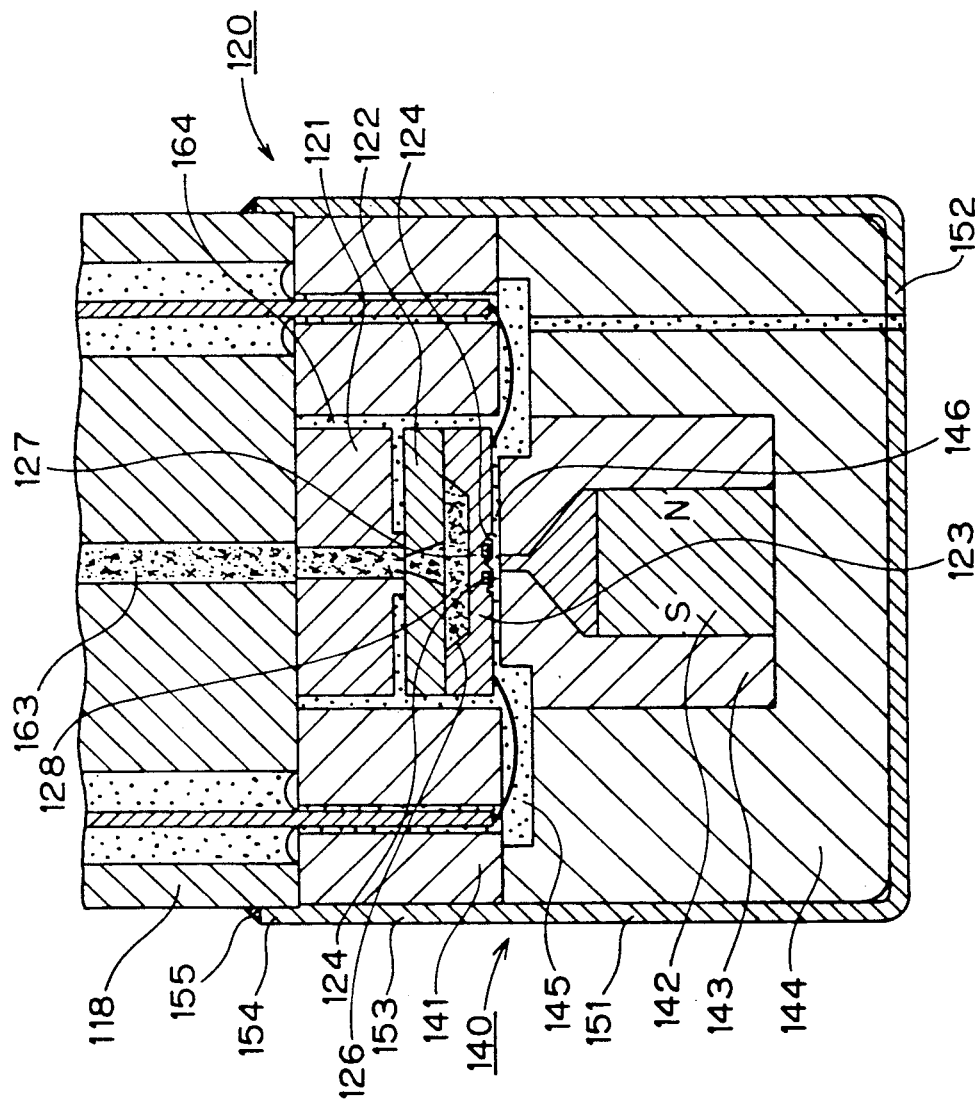
Figure 10:
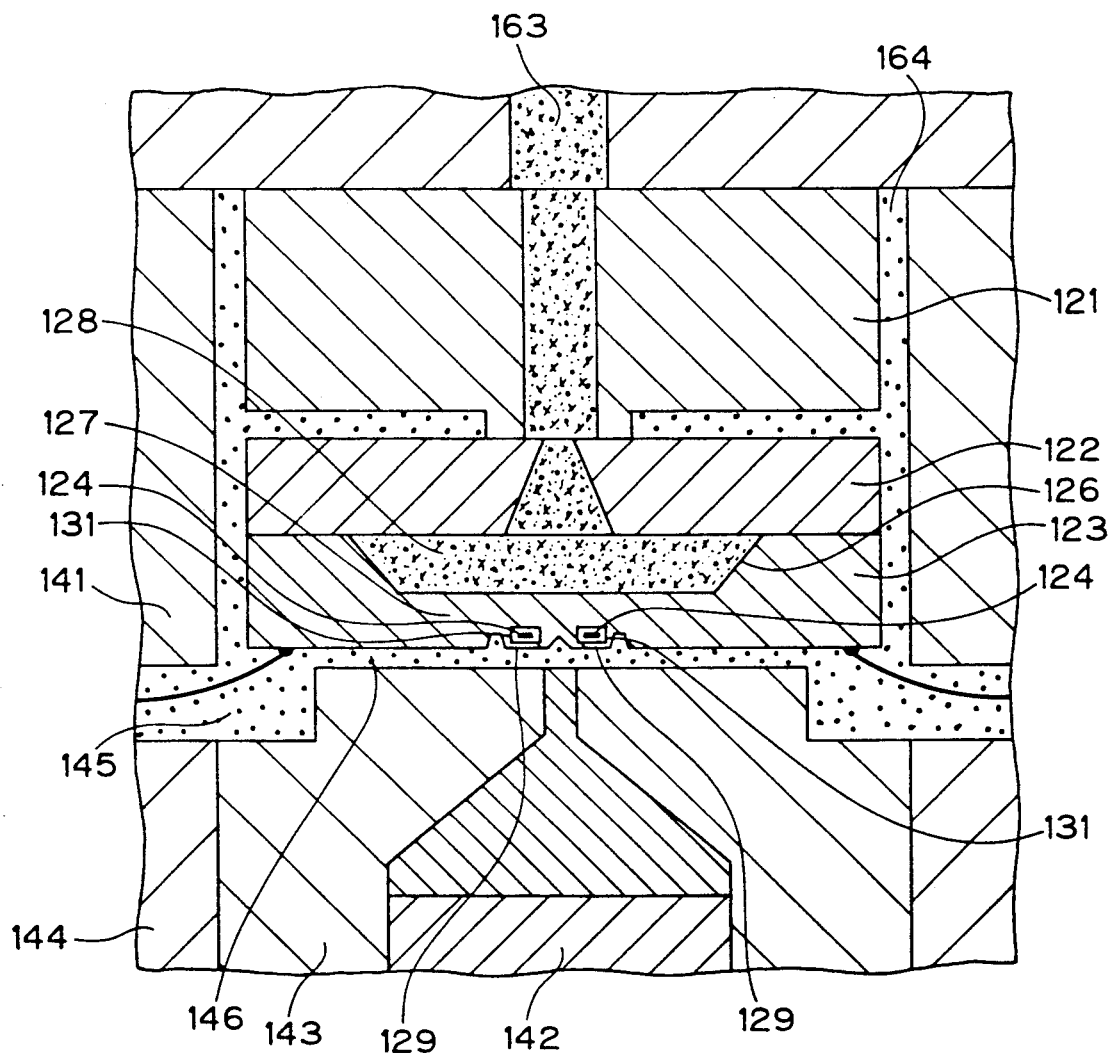

FIGS. 8, 9, 10 depict an illustrative embodiment of the invention, comprising a block-like body 101 having therein an internal chamber 102 and a center diaphragm 103 for dividing inside chamber 102 into two center chambers 104,105. Seal diaphragms 111, 112 are provided in the external side surface of body 101, and form body 101 and seal chambers 113 and 114. Back up nests 115, 116 are provided in body 101 in opposition to seal diaphragms 111, 112. A communicating hole 117 is provided for communicating between center chambers 104,105 and seal chambers 113,114.

A housing 118 has one surface thereof connected to body 101 and an inside vacant space 119. A sensor part 120 (see FIGS. 9,10) is provided comprising a supporting body 121, a substrate 122, a chip part 123, and a vibrator beam 124. Supporting body 121 is provided in internal vacant space 119. Substrate 122 has one surface thereof supported by supporting body 121, and consists of silicon. Chip part 123, which consists of silicon, has a diaphragm 127 formed with a concave part 126, and a measuring chamber 128 on one side constituted of substrate 122 and concave part 126. The vibrator beam 124 is provided in diaphragm 127 which has a vacant space 131. The part between vacant space 131 and the external surface of chip part 123 constitutes a shell 129.

A DC applying means 140, see FIG. 9, comprises a spacer 141, a permanent magnet 142, a yoke 143, and a yoke holder 144, and constitutes sensor part 120 and measuring chamber 145 on another side, and applies DC magnetic field to vibrator beam 124. Spacer 141 has one surface fixed in housing 118, and is provided in the circumference of supporting body 121, substrate 122, and chip part 123. Permanent magnet 142 is arranged in opposition to vibrator beam 124. Yoke 143 holds permanent magnet 142 and applies perpendicularly intersecting magnetic flux to the axial direction of vibrator beam 124 Yoke 143 has one surface approaching diaphragm 127, and forms a suitable narrow vacant space 145 therebetween. Yoke holder 144 holds yoke 143 and is fixed to spacer 141.

A cap body 151 is provided having an U shaped cross section and having elasticity for precisely setting the relative position of vibrator beam 124 and magnet 142. Cap body 151 consists of a material having a thermal expansion coefficient substantially equal to that of yoke holder 144 and housing 118, and is constructed so that yoke holder 144 is fitted in a gap at bottom part 152. Body 151 presses yoke holder 144 against spacer 141. At the opening 153 of cap body 151, housing 118 is fitted, welded (at 155), and fixed at open port peripheral part 154.

A communicating hole 161 (see FIG. 8) is provided for communicating measuring chamber 145 (see FIG. 9) of another side to another side of center chamber 105. Non-compressive charged liquids 163, 164, respectively, are charged in the two chambers constituted of seal chambers 113,114, communicating holes 117, 161, 162, center chambers 105,106, internal vacant space 119, and measuring chambers 128,145. In this case, silicon oil is used as the charged liquids In the embodiment, the differential pressure applied to seal diaphragms 111 and 112 is transmitted to measuring chambers 128,145, respectively,, via communicating holes 161,162, and causes diaphragm 127 to be displaced in correspondence to the differential pressure. The displacement which is proportional to this differential pressure causes the axial power of vibrator beam 124, which is fixed at both ends to diaphragm 127, to be changed.

Vibrator beam 124 vibrates at its natural frequency by application of magnetic field using DC applying means 140 and closed loop self exciting vibration circuit (which will be described in further detail hereinafter) connected to the vibrator beam 124. Since the natural frequency of vibrator beam 124 changes, when the axial power of the vibrator beam 124 changes, the pressure being measured can thus be accurately measured.

Diaphragm 127 does not resonate with vibrator beam 124, because it is damped by yoke 143 which is arranged to hold a predetermined gap in opposition to measuring diaphragm 127, with a suitable interval dimension of the predetermined gap 146, and with a suitable viscosity resistance of the charged liquid 164 disposed in gap 146.

Also, since the frequency answering characteristics of measuring diaphragm 127 becomes less than the critical attenuation for an external shock wave type measuring pressure, the pressure is perfectly damped, and a flat frequency answer is obtained up to the resonance frequency of measuring diaphragm 127. That is to say, although diaphragm 127 has a resonance frequency determined by its shape, it is braked by silicon oil 54 disposed in the gap between diaphragm 127 and yoke 143, and diaphragm 127 can be made not to resonate, even if the vibration frequency number of vibrator beam 124 coincides with the resonance frequency of diaphragm 127. For example, in the embodiment, the foregoing condition is sufficiently attained using silicon oil of 100 cs in gap 146 which is between yoke 143 and diaphragm 127 and which is of less than 0.1 mm width.

Figure 11:
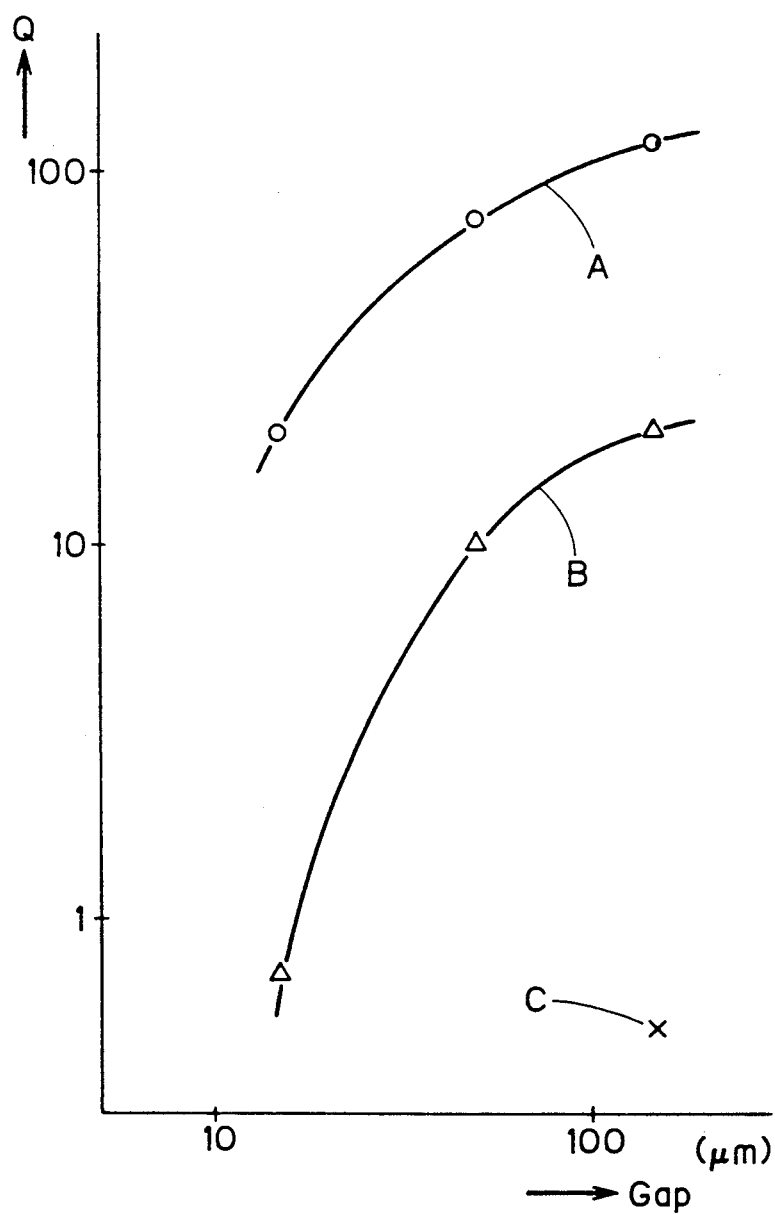
FIGS. 11, 12 are diagrams for explaining the performance of the embodiment of FIG. 8.

FIG. 11 shows the relationship of the Q of diaphragm 127 and gap 146 in various types of fluids. It is known that at $Q<0.7$, the influence of the resonance of diaphragm 127 becomes small. A shows the case where the charged liquid 164 is the atmosphere. B shows the case where the charged liquid 164 is freon. C shows the case where the charged liquid 164 is silicon oil.

Since yoke 143 is arranged to keep a predetermined gap 146 in opposition to diaphragm 127 with a suitable interval dimension h of predetermined gap 146, and a suitable viscosity resistance of charged liquid 164 disposed in gap 146. The device is constituted so that the frequency answer, that is response, characteristic of diaphragm 127 for the external shock wave type pressure becomes less than the critical attenuation, so that it is perfectly damped, and a flat frequency response is obtained up to the resonance frequency of diaphragm 127.

The following results are attained.

(1) Since resonance of diaphragm 127 is not generated for vibrator beam 124, there is no deterioration of the linearity by the presence of resonance, and no generation or hysteresis. Thus, a vibrating type pressure measuring device of high precision is produced.

(2) Even if a shock wave type pressure is applied to the device, diaphragm 127 is not destroyed. Thus, a pressure measuring device is produced having high frequency response.

(3) The squeeze R and the volume can be made small. Accordingly, a device having good temperature characteristics can be readily miniaturized.

Figure 12:
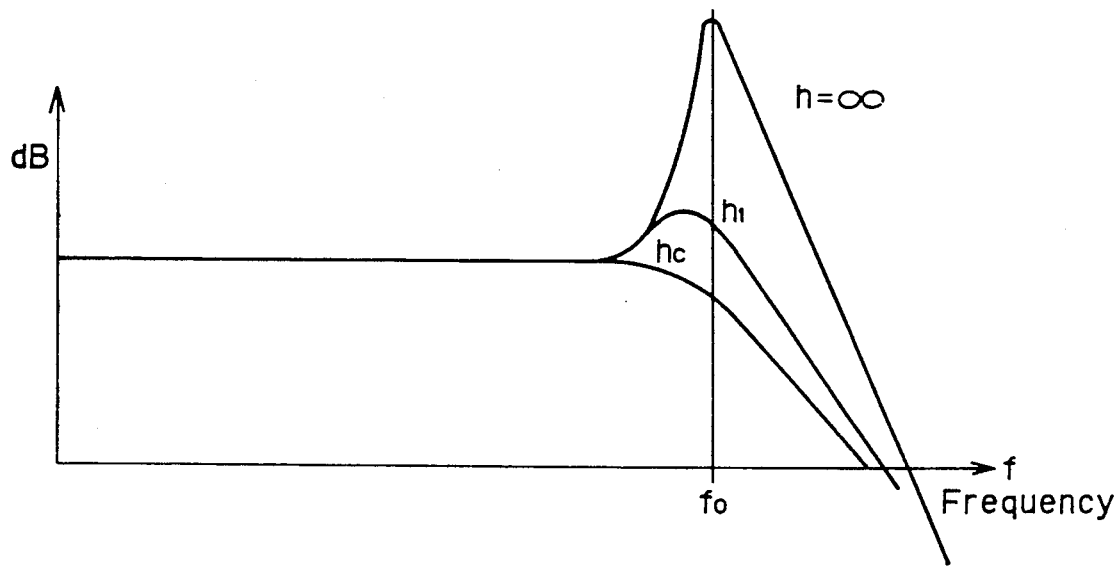

FIG. 12 shows the relationship between the gap dimension h and the frequency wave characteristics of the invention. As described, in cap body 151, housing 118 and yoke holder 144 are fitted therein and bottom part 152 thereof pushes yoke holder 144 and spacer 141 in the direction of vibrator beam 124. The open port peripheral part 154 of cap body 151 is fixed to housing 118 by welding 155. Cap body 151 pushes yoke holder 144 to housing 118. The relative position of housing 118 and yoke holder 144 are accordingly correctly assured. Thus, the relative position of vibrator beam 124 and magnet 142 in the perpendicular direction to the axis of cap body 124 can be precisely and correctly assembled. Accordingly, the output characteristics and precision of measurement are substantially improved.

Figure 13:
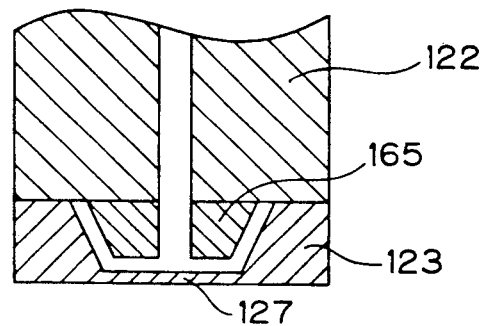
FIG. 13 is a diagram depicting an important part of another illustrative embodiment of the invention.

Also, in fixing the cap body 151 and bottom part 152, there is no joining or adhesion. Thus, there is no harmful stress concentration, strain, etc, caused by external disturbances, such as that of temperature. Accordingly, stable, strong and reliable characteristics of the device are assured for a long period of time FIG. 13 depicts a rigid body wall 165 in opposition to the internal side surface of diaphragm 127.

Figure 14:
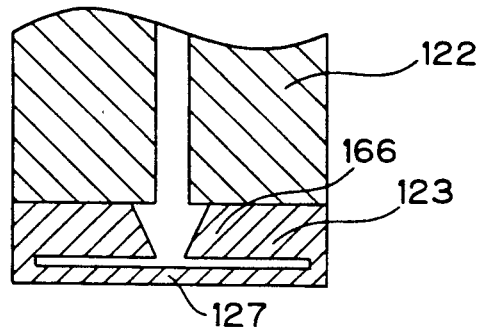
FIG. 14 is a diagram depicting an important part of a further illustrative embodiment of the invention.

FIG. 14 depicts diaphragm 127 and rigid body wall 166 as a unitary piece.

Figure 1:
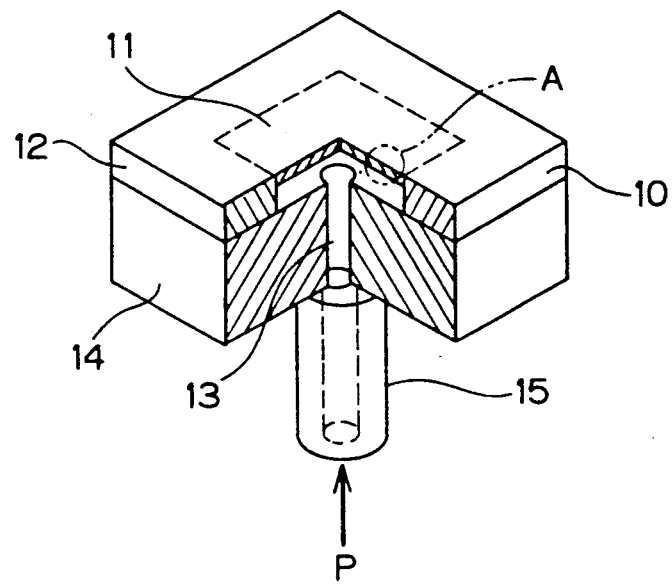
FIGS. 1-4 are diagrams depicting a conventional device.
Figure 2:
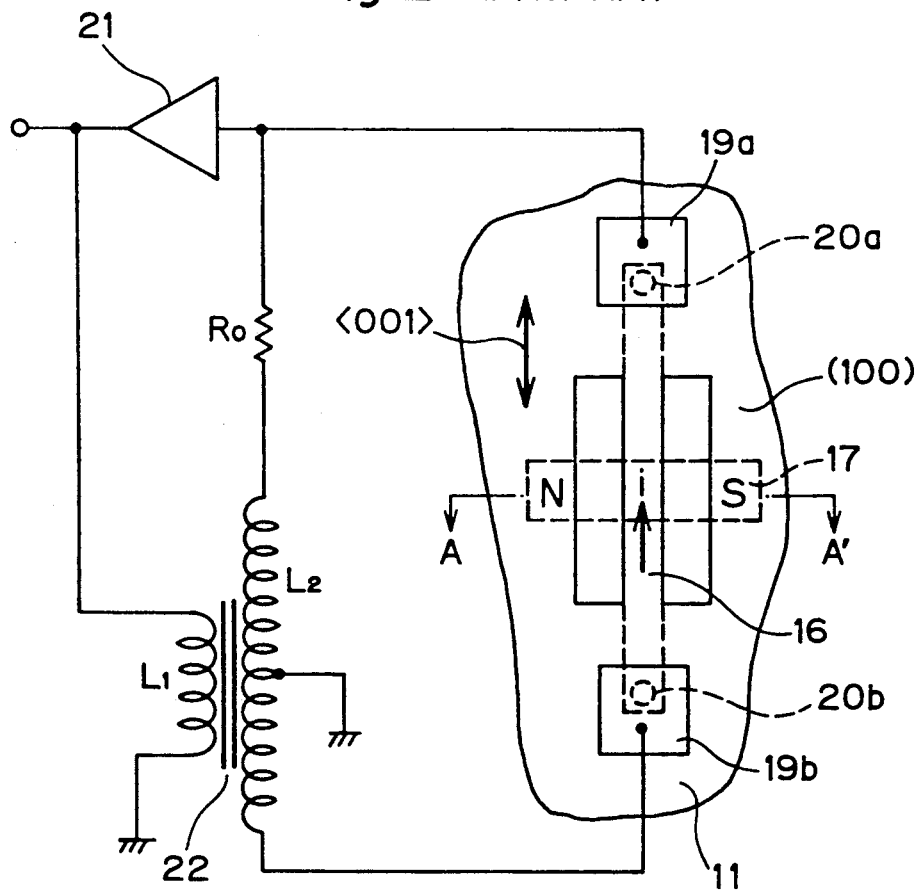
Figure 3:
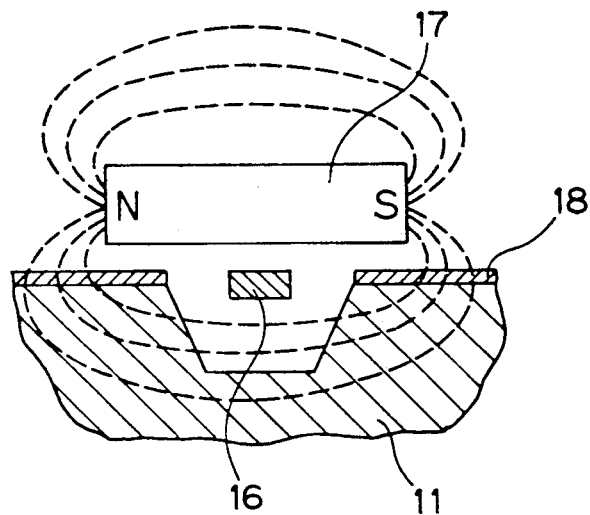
Figure 4:
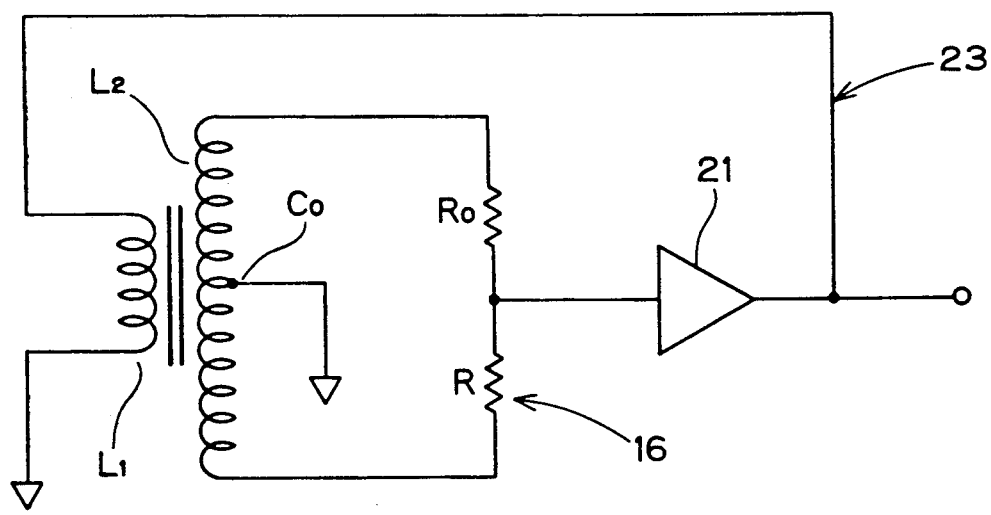
Figure 5:
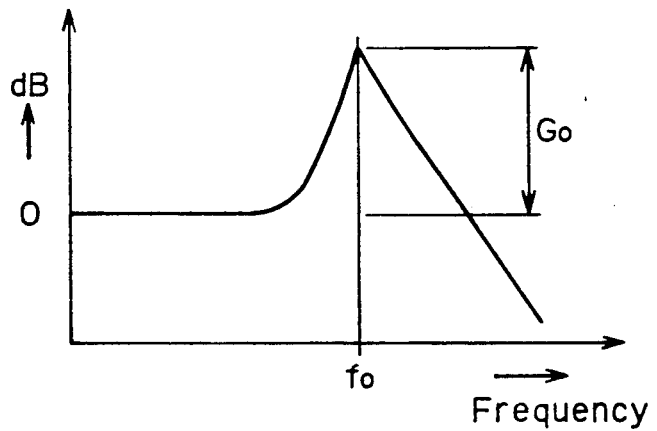
FIGS. 5, 6, 7 are diagrams for explaining the performance of the device of FIG. 1.
Figure 6:
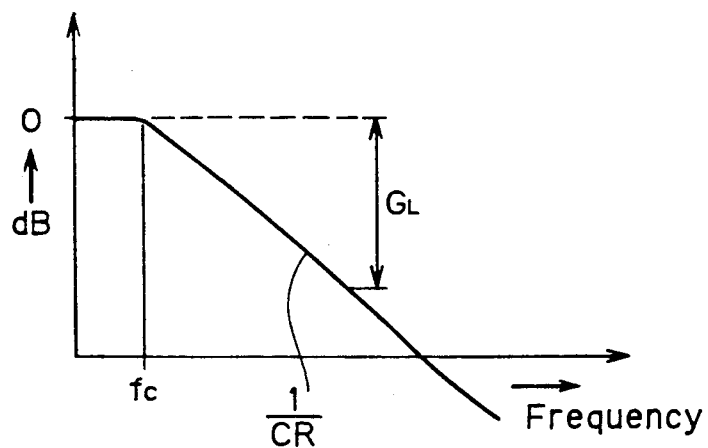
Figure 7:
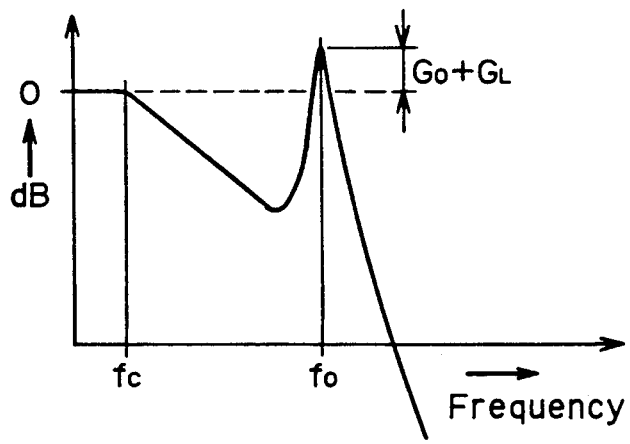
Figure 15:
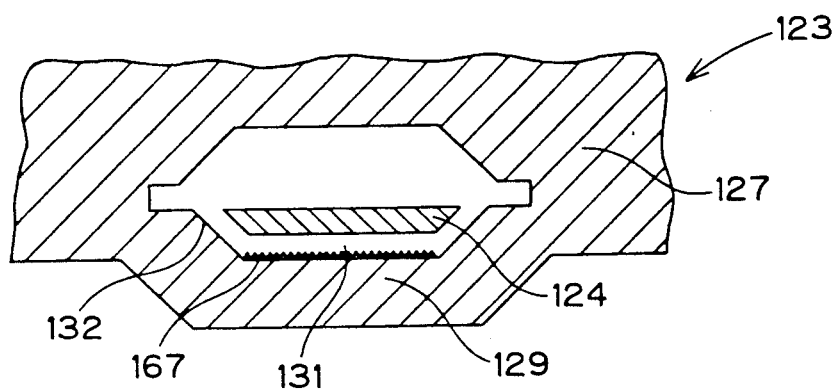
FIG. 15 is a diagram depicting an important part of another illustrative embodiment of the invention.

FIG. 15 depicts another embodiment, which is best understood by first referring to FIG. 1, wherein the surface of vibrator 3 is made of a mirror surface. Since the surface roughness is fine and the surface is active, when vibrator 3 contacts the wall surface of diaphragm 11 (such as when moved by external disturbances, such as shock waves, etc, or buckling, etc, by large compressive forces), the vibrator may adhere to the wall surface of the diaphragm thereby making the device substantially inoperative.

As a countermeasure, it may be possible to incline the side wall surface of the diaphragm 11, and have the side surface in the lengthwise direction of vibrator 3 just touch the inclined surface to form a line contact.

However, such a possible construction does not solve the problem of the vibrator beam adhering to the wall surface of the diaphragm.

The embodiment of FIG. 15 resolves the aforementioned problem and comprises a rough or uneven surface 167 provided on wall surface 132 of diaphragm 127 or on the surface of vibrator beam 124 in such a manner that vibrator beam 124 does not adhere to wall surface 132 of diaphragm 127. In the embodiment, the surface 167 of wall surface 132 of diaphragm 127 consists of a polysilicon layer having a large surface. That is to say that surface 167 is rough or uneven, in contrast to the conventional fine or mirror surface.

In the embodiment, even if vibrator beam 124 contacts the wall surface of diaphragm 127, due, for example, to movement caused by external disturbances, such as shock, buckling, etc, vibrator beam 124 does not adhere to wall surface 132 of diaphragm 127 because of the existence of rough surface 167. Thus, when the external disturbance is removed, the device returns to the initial state without adverse effect. That is vibrator beam 124 does not adhere to wall surface 132. Accordingly, reliability is substantially improved.

Although the embodiment shows the rough surface 167 to be provided on a part of wall surface 132, layer 167 may be provided on the entire surface of the wall surface 132.

Chip part 123 may be prepared, for example, by the steps outlined in FIGS. 16 to 22.

Figure 16:
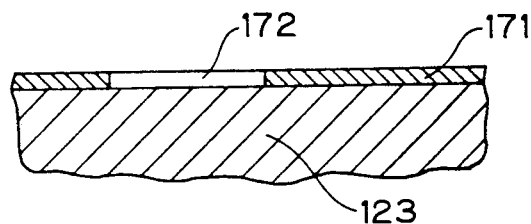
FIGS. 16-22 are diagrams depicting the procedure for producing the embodiment of FIG. 15.

1. As shown in FIG. 16, on chip part 123 which is cut on an n type silicon (100) surface, film 171 is formed which is of silicon oxide or silicon nitride. A required portion 172 of film 171 is removed by photolithography.

Figure 17:
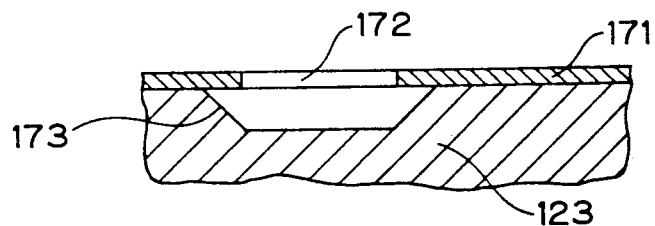

2. As shown in FIG. 17, in a hydrogen atmosphere of 1050° C. a concave part 173 is formed by etching with hydrogen chloride and by etching a required portion 172 of chip part 123, and then by undercutting film 171.

Anisotropic etching may be used in which high temperature steam and oxygen are used, or an alkaline liquid of 40° C. to 130° C. is used, instead of hydrogen chloride.

Figure 18:
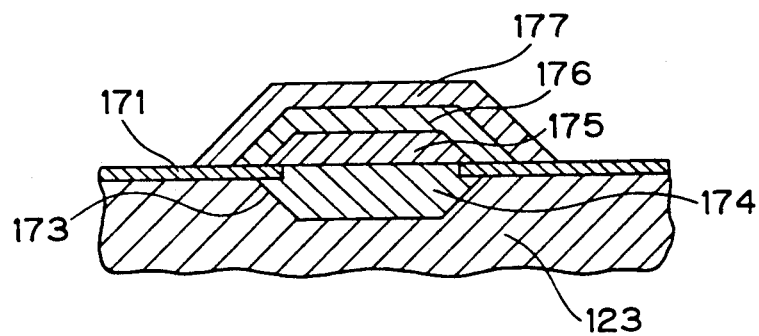

3. As shown in FIG. 18, selective epitaxial growth is carried out in an atmosphere of hydrogen of 1050° C. by mixing hydrogen chloride gas in the source gas. That is, the following steps are carried out.

A. First epitaxial layer 174, corresponding to half of gap 131, is subjected to selective epitaxial growth with p type silicon of a boron concentration of $10^{18}$ cm$^{-3}$.

B. Second epitaxial layer 175, corresponding to oscillation beam 124, is subjected to selective epitaxial growth with p type silicon of boron concentration of $3 \times 10^{19}$ cm$^{-3}$.

C. On the surface of second epitaxial layer 175, third epitaxial layer 176 corresponding to the lower half of gap 131 is subjected to selective epitaxial growth with p type silicon of boron concentration of $10^{18}$ cm$^{-3}$.

D. On the surface of third epitaxial layer 176, fourth epitaxial layer 177, corresponding to shell 129, is subjected to selective epitaxial growth with p type silicon of a boron concentration of $10^{19}$ cm$^{-3}$.

Figure 19:
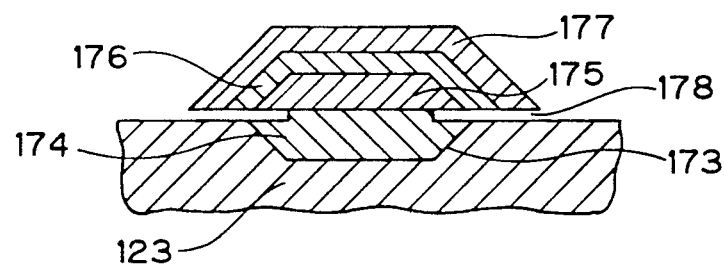

4. As shown in FIG. 19, an etching pouring inlet 178 is provided by removing film 171 by etching with hydrogen flouride acid (HF).

Figure 20:
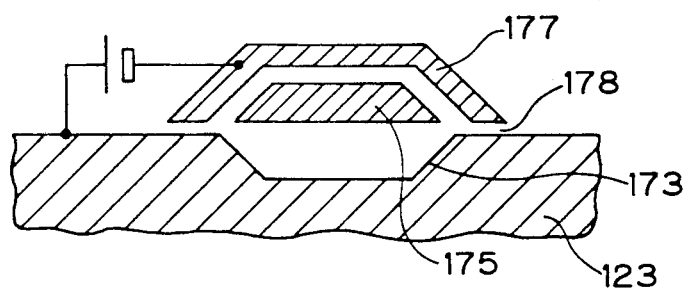

5. As shown in FIG. 20, for the fourth layer 177, by applying a positive pulse or positive voltage to chip part 123 and by pouring in an alkaline liquid from the etching pouring inlet 178, first epitaxial layer 174 and third epitaxial layer 176 are removed by selective etching.

There is a difference in etching actions between second epitaxial layer 175 and first epitaxial layer 174 or third epitaxial layer 176 is that a suppressing phenomenon is generated in the etching when the boron concentration is about or more than $3 \times 10^{19}$ cm$^{-3}$.

Figure 21:
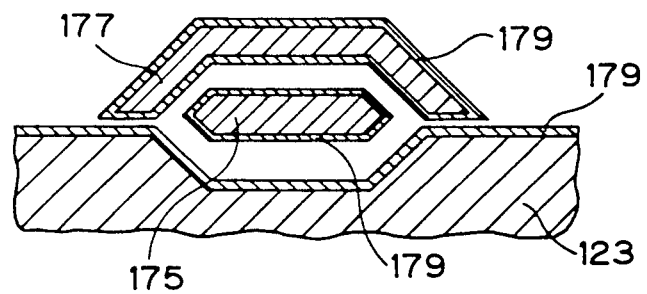

6. As shown in FIG. 21, on the entire surface of fourth layer 177, film 179 of silicon oxide or silicon nitride, is formed. In this case, film 179 is of silicon oxide.

Figure 22:
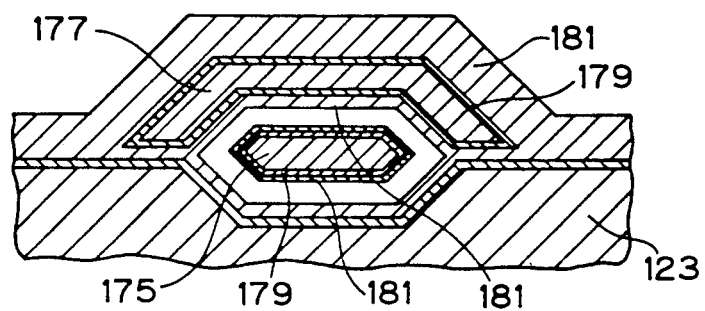

7. As shown in FIG. 22, a polysilicon layer 181 is formed at 950° C. and in 200 Torr in an environment of silane (SiH4) of 0.3 l/min, phosphine (PH3) of 0.0005 l/min, and hydrogen of 200 l/min, with etching pouring inlet 178 being closed. The surface roughness of polysilicon layer 181, in this case, is about 0.1 µm in pitch interval. Pitch interval means the distance between adjacent high points.

Figure 23:
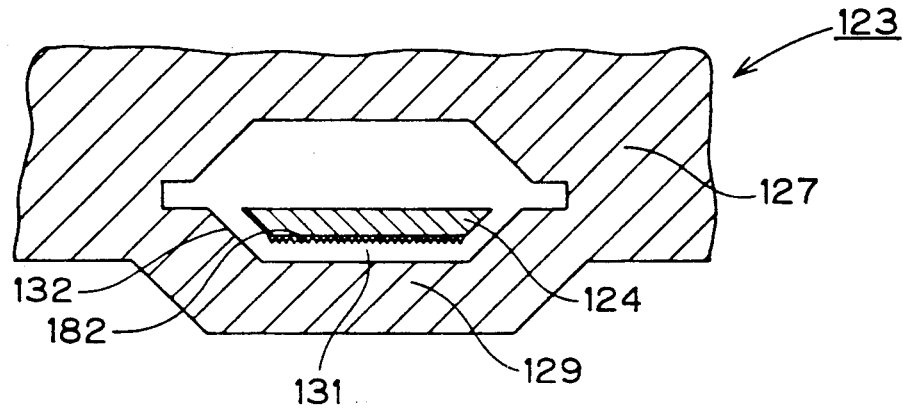
FIG. 23 is a diagram depicting an important part of still another illustrative embodiment of the invention.

FIG. 23 depicts an enlarged portion of vibrator 124 with the same symbols as those in FIG. 8 representing the same functions. A rough surface 182 is provided on one surface in the side of shell 129 of vibrator beam 124. When a measuring pressure is applied to vibrator beam 124, the axial force of vibrator 124 changes. Since the natural frequency of vibrator 124 changes accordingly, the pressure is measured by the changes in vibrator frequency.

A rough surface 182 is provided. Thus, vibrator 124 will not adhere to wall surface 132 of diaphragm 127 even if they should come into contact with each other, such as due to external disturbances. Accordingly, the vibrator beam 124 will return to its initial state, without adherence, when such external disturbance is removed.

Figure 24:
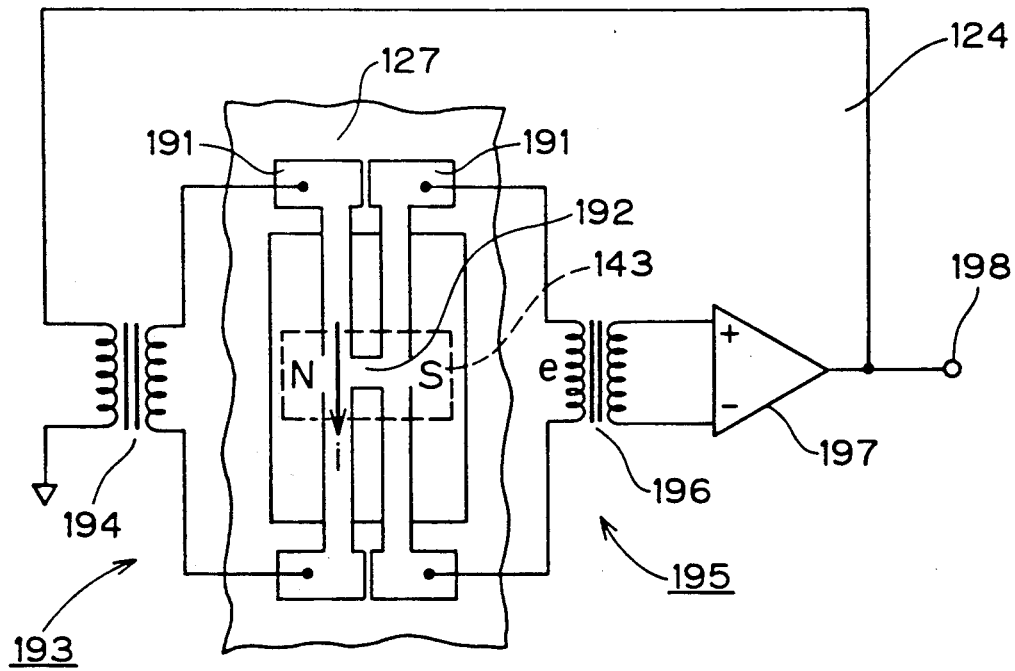
FIG. 24 is a diagram depicting use of the vibrator beam of the invention.

FIG. 24 depicts use of the vibrator beam of the invention, wherein vibrator beam 124 comprises terminals fixed on diaphragm 127, and equipped with two first vibrators 191 and a second vibrator 192, for mechanically connecting the node parts of the vibrational parts of first vibrators 191.

Vibration exciting means 193 is provided for exciting vibrator beam 124 by magnetic induction action in a direction for perpendicularly intersecting the magnetic field. AC current is supplied by input transformer 194 to both terminals of first vibrator 191. A perpendicularly intersecting magnetic field is supplied by magnet 143 to vibrator beam 124. The secondary winding of input transformer 194 is connected to both terminals of first vibrator 191, as depicted.

Vibration detecting means 195, comprising output transformer 196 and amplifier 197, are provided for detecting the electromotive force generated in both terminals of the other first vibrators 191. The primary winding of output transformer 196 is connected to both terminals of the other first vibrator 191, and the secondary winding is connected to output terminal 198 via amplifier 197. The output terminal 198 is connected by lead to the primary winding of input transformer 194. The arrangement constitutes a positive feed back self exciting vibration circuit. The vibration of vibrator beam 124 is detected by vibration detecting means 195, and may be outputted as output signals from output terminal 198.

Although in the embodiment a rough or uneven surface, e.g. 182, is provided on the wall surface of shell 129 on the wall surface 132 of the diaphragm, or one surface of shell 127 of vibrator beam 124, the invention is not limited to such an arrangement. For example, the rough or uneven surface may be provided on the entire wall surface of diaphragm 132 or on the entire surface of vibrator beam 124. The rough or uneven surface arrangement, advantageously, prevents adhesion of the vibratory beam 124 to the diaphragm wall surface 132.

Figure 25:
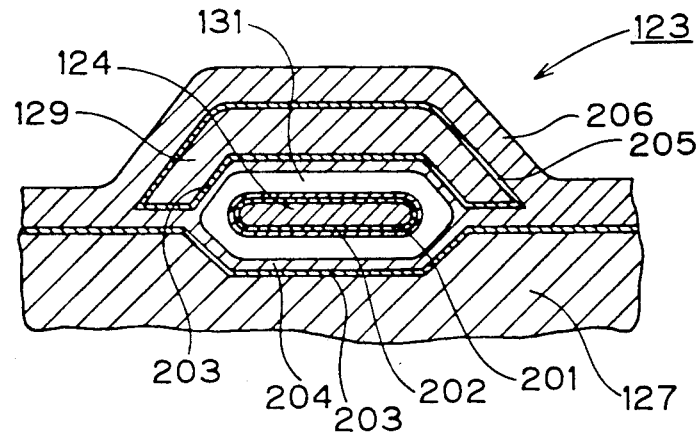
FIG. 25 is a diagram depicting an important part of a further illustrative embodiment of the invention.

FIG. 25 depicts an embodiment wherein the same symbols as those used in FIG. 8 represent the same functions. A first layer 201, consisting of an oxide film or nitride film, is provided covering the surface of vibrator beam 124. A second layer 202 consisting of polysilicon and having a rough or uneven surface is provided covering the surface of first layer 201. A third layer 203, consisting of oxide film or nitride film, is provided covering the wall surface 132. A fourth layer 204, consisting of polysilicon, is provided covering the surface of third layer 203. A fifth layer 205, consisting of oxide film or nitride film, is provided covering the external surface of shell 129. A sixth layer 206, consisting of polysilicon, is provided covering the surface of fifth layer 205.

The embodiment of FIG. 25 is produced by the steps shown in FIGS. 26-32, as described hereinbelow.

Figure 26:
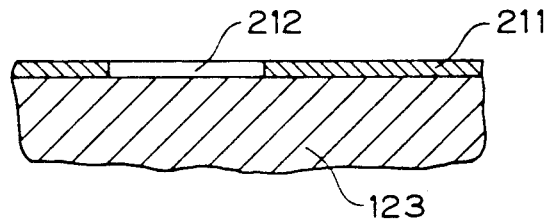
FIGS. 26-32 are diagrams depicting the procedure for producing the embodiment of FIG. 25.

1. As shown in FIG. 26, on chip part 123, cut on the (100) plane of an n type silicon, film 211 of silicon oxide or silicon nitride, is formed. A required portion 212 of film 211 is removed by photolithography.

Figure 27:
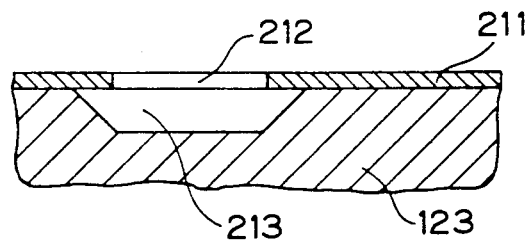

2. As shown in FIG. 27, in a hydrogen atmosphere of 1050° C., etching is carried out using hydrogen chloride. A concave part 213 is formed by undercutting film 211 by etching required portion 212.

Instead of hydrogen chloride, high temperature steam and oxygen may be used. Anisotropic etching with an alkaline liquid of 40° to 130° C. may be also used.

Figure 28:
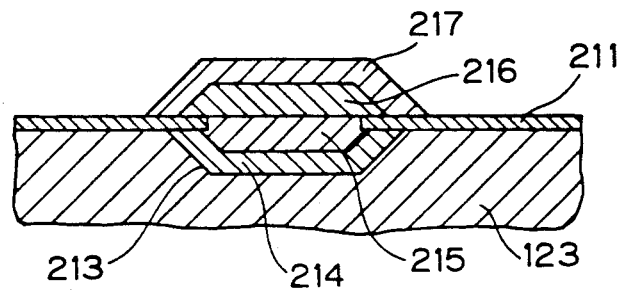

3. As shown in FIG. 28, in a hydrogen atmosphere of 1050° C., selective epitaxial growth is carried out by mixing hydrogen chloride gas in the source gas, as follows.

A. With a p type silicon of a boron concentration of $10^{18}$ c cm$^{-3}$, first epitaxial layer 214, corresponding to the upper half of gap 131, is subjected to selective epitaxial growth..

B. With a p type silicon of a boron concentration of $3 \times 10^{19}$ cm$^{-3}$, second epitaxial layer 215, corresponding to vibrator beam 124 is subjected to selective epitaxial growth in such a manner that required portion 212 is closed on the surface of first epitaxial layer 214.

C. With a p type silicon of a boron concentration of $10^{18}$ cm$^{-3}$, third epitaxial layer 216, corresponding to the lower half of gap 131, is subjected to selective epitaxial growth on the surface of second epitaxial layer 215.

D. With a p type silicon of a boron concentration of $3 \times 10^{19}$ cm$^3$, fourth epitaxial layer 217, corresponding to shell 4, is subjected to selective epitaxial growth on the surface of third epitaxial layer 216.

Figure 29:
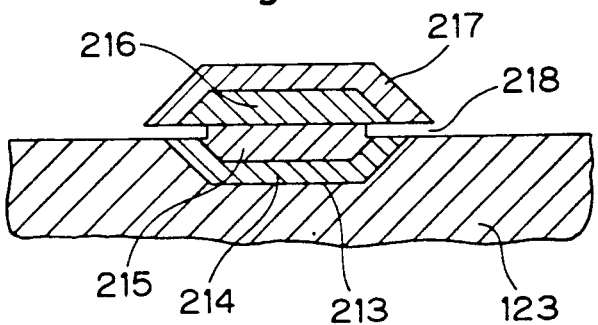

4. As shown in FIG. 29, film 211 (see also FIG. 28) of silicon oxide or silicon nitride, is removed by etching with hydrogen fluoride acid (HF), and an etching pouring inlet 218 is thus produced.

Figure 30:
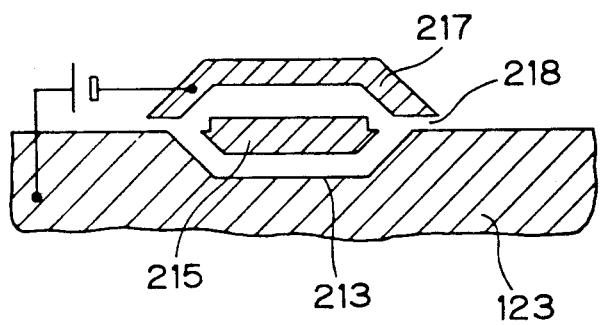

5. As shown in FIG. 30, by applying a positive pulse of a positive voltage to chip part 123 for the fourth layer 217, first epitaxial layer 214 (see FIG. 29) and third epitaxial layer 216 (see FIG. 29) are removed by selective etching by pouring in an alkaline liquid through etching pouring inlet 218.

As before stated, there is a difference in etching action between second epitaxial layer 215 and first epitaxial layer 214 or third epitaxial layer 216 due to the suppression of etching caused when the boron concentration reaches $3 \times 10^{19}$ cm$^{-3}$ or more.

Figure 31:
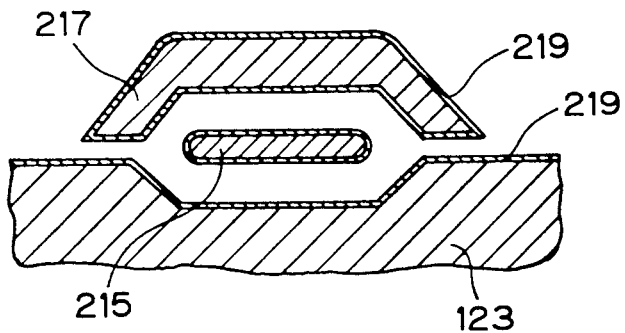

6. As shown in FIG. 31, film 219 of silicon oxide or silicon nitride, is formed on the entire body. In this case, film 219 is of silicon oxide. Incidently, in the specification, we refer to silicon dioxide as silicon oxide.

Figure 32:
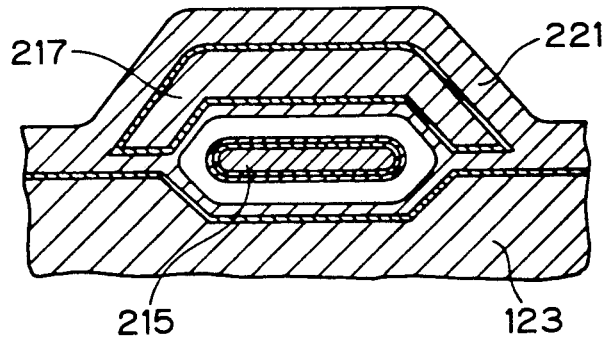

7. As shown in FIG. 32, at 950° C. and in 200 Torr pressure, in an atmosphere of silane (SiH4) of 0.3 phosphine (PH$_3$) of 0.0005 l/min, and hydrogen of 200 l/min; a polysilicon layer 221 is formed on silicon oxide film 219, and etching pouring inlet 218 is closed. The surface roughness of polysilicon layer 221 is about 0.1 μm in pitch interval.

As a result, vibrator beam 124 does not adhere to the wall surface of shell 129, and reliability of the device is improved.

FIG. 23 depicts another illustrative vibrator beam, wherein the same symbols as those in FIG. 8 represent the same elements. A first layer 231, consisting of an oxide film or a nitride film, is provided covering the surface of vibrator beam 124. A second layer 232, consisting of polysilicon of a rough surface, is provided covering the surface of first layer 231. A third layer 233, consisting of an oxide film or an nitride film, is provided covering the wall surface 132 of diaphragm 127. A fourth layer 234, consisting of polysilicon, is provided covering the surface of third layer 223. A seventh layer 235, consisting of a silicon single crystal, is provided covering the external surface of shell 129.

Figure 33:
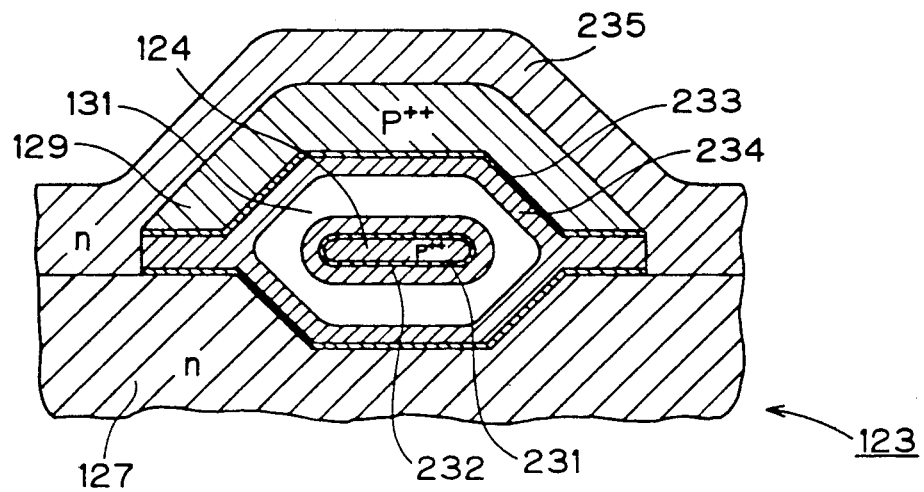
FIG. 33 is a diagram depicting an important part of yet another illustrative embodiment of the invention.

The embodiment of FIG. 33, is produced by the steps illustrated in FIGS. 34–42, as hereinafter described.

Figure 34:
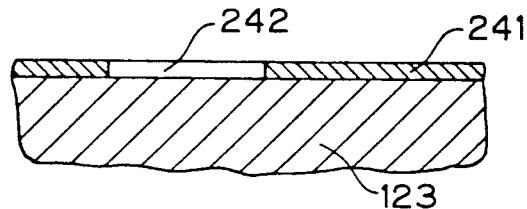
FIGS. 34-42 are diagrams depicting the procedure for producing the embodiment of FIG. 33.

1. As shown in FIG. 34, film 241, of silicon oxide or silicon nitride, is formed on chip part 123, which is cut on the (100) plane of an n type silicon. Required portion 242 of film 241 is formed by removal of film 241 thereat by photolithography.

Figure 35:
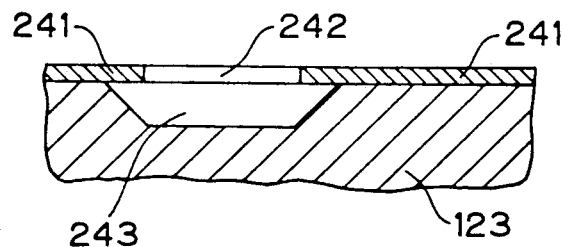

2. As shown in FIG. 35, in an atmosphere of hydrogen of 1050° C., etching is carried out with hydrogen chloride, and required portion 242 of chip part 123, is etched through so that film 241 is undercut to form a concave part 243. Instead of hydrogen chloride, high temperature steam and oxygen may be used . Also, anisotropic etching by an alkaline liquid at 40° C. to 130° C. may be used.

Figure 36:
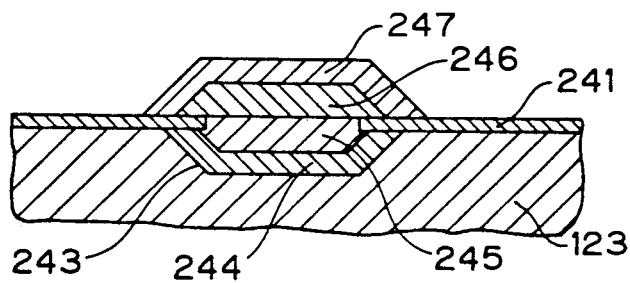

3. As shown in FIG. 36, in an atmosphere of hydrogen of 1050° C., selective epitaxial growth may be carried out by mixing hydrogen chloride gas in the source gas, as follows.

A. Using p type silicon of a boron concentration of $10^{18}$ cm$^{-3}$, first epitaxial layer 244, corresponding to the upper half of gap 131, is subjected to selective epitaxial growth.

B. Using p type silicon of a boron concentration of $3 \times 10^{19}$ cm$^{-3}$, second epitaxial layer 245, corresponding to vibrator beam 124, is subjected to selective epitaxial growth on the surface of first epitaxial layer 244, in such a manner as to close required portion 242.

C. Using p type silicon of a boron concentration of $10^{18}$ cm$^{-3}$, on the surface of second epitaxial layer 245, third epitaxial layer 246, corresponding to the lower half of gap 131, is subjected to selective epitaxial growth.

D. Using p type silicon of a boron concentration of $3 \times 10^{19}$ cm$^{-3}$, fourth epitaxial layer 247 is subjected to selective epitaxial growth on the surface of third epitaxial layer 246.

Figure 37:
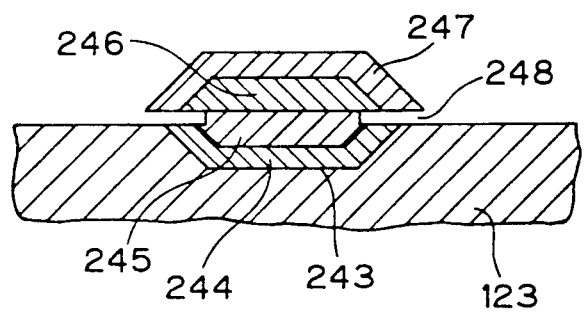

4. As shown in FIG. 37, film 241, of silicon oxide or silicon nitride, is removed by etching with hydrogen fluoride to provide an etching pouring inlet 248.

Figure 38:
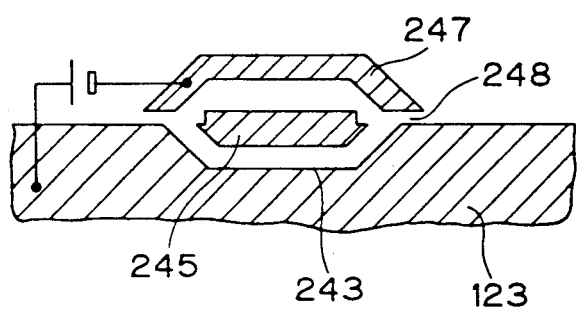

5. As shown in FIG. 38, by applying a positive pulse or a positive voltage to chip part 123 and fourth layer 247, and by pouring in an alkaline liquid through etching pouring inlet 248, first epitaxial layer 244 and third epitaxial layer 246 (see FIG. 37) are removed by selective etching.

Due to the different boron concentrations, there are different etching actions, as discussed with the prior embodiments.

Figure 39:
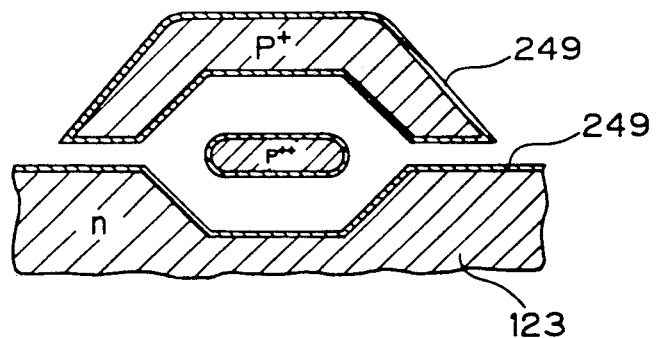

6. As shown in FIG. 39, film 249 of silicon oxide or silicon nitride, is formed on the entire body. Film 249 is of silicon oxide.

Figure 40:
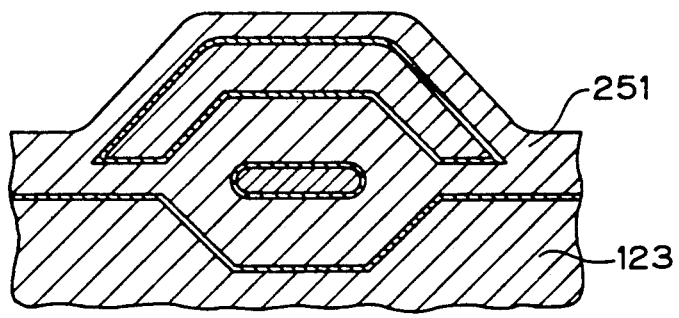

7. As shown in FIG. 40, positive type resist 251 is painted on the entire body. After applying resist 251, the entire surface is exposed to ultraviolet rays.

Figure 41:
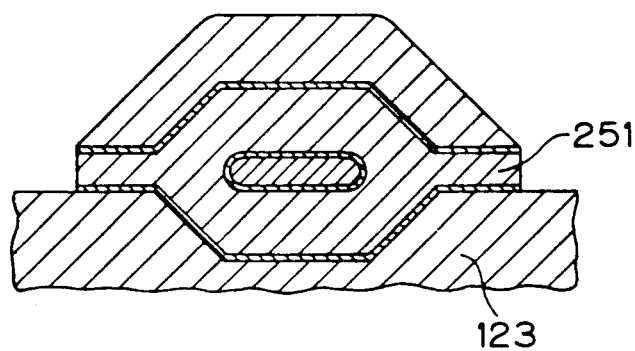

8. As shown in FIG. 41, resist 251 is developed, and the exposed part is removed. Then, the silicon oxide films 249 on the external surface of fourth epitaxial layer 247 and the external surface of chip part 123 are also removed by etching.

Figure 42:
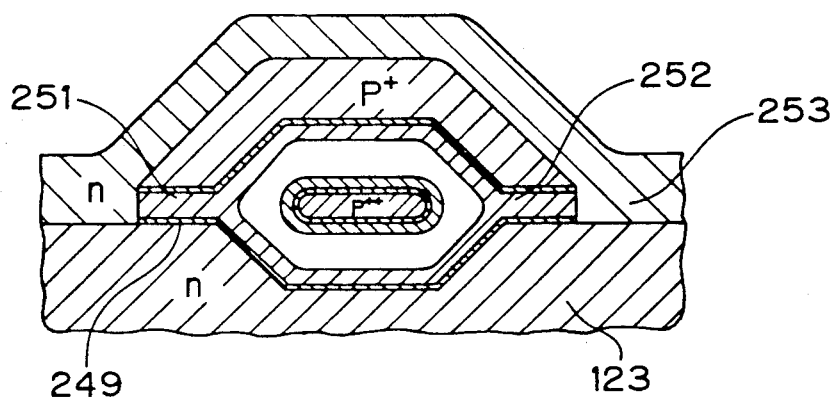

9. As shown in FIG. 42, resist 251 is removed. Then, at 950° C. and at 200 Torr pressure, in an atmosphere of silane (SiH₄) of 0.3 l/min phosphine (PH₃) of 0.0005 l/min, and hydrogen of 200 l/min, polysilicon layer 252 is formed on the surface of film 249, and the etching pouring inlet 248 (see FIG. 38) is closed.

Then, on the external surface of fourth epitaxial layer 247 and the external surface of chip part 123, is formed n type fifth epitaxial growth layer 253. The surface roughness of polysilicon layer 252 in this embodiment is about 0.1 μm in pitch interval.

As a result, since the surface of vibrator beam 124 is covered by second layer 252 consisting of polysilicon having a rough or uneven surface, vibrator beam 124 is prevented from adhering to the surface of shell 129, and reliability of the device is improved.

Also, the surface of diaphragm 127 on the outside outside of shell 129 can be of a single crystal to take advantage of the strength, elastic characteristics, and stability of the single crystal.

Figure 43:
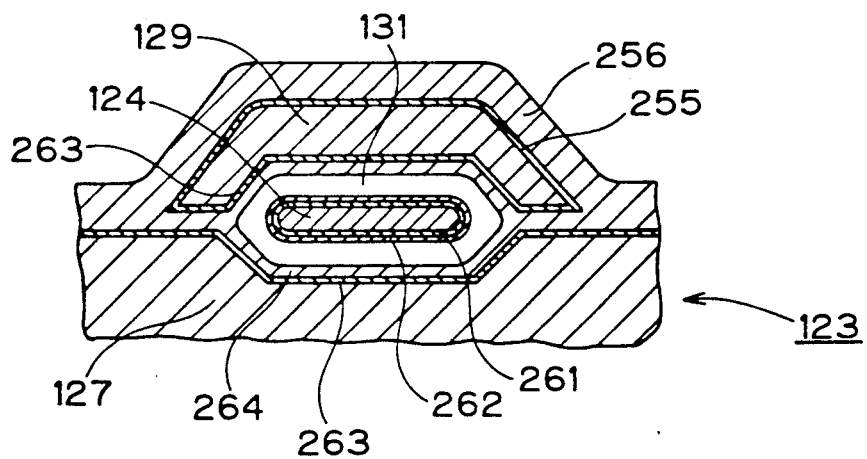
FIG. 43 is a digram depicting an important part of still further illustrative embodiment of the invention.

FIG. 43 depicts a further illustrative vibrator beam 124, wherein the same symbols as those in FIG. 8 represent the same elements. As background information, in general, the tension of vibrator beam 124, when used as a strain gauge, produces influence known as the gauge factor GF.

$$GF=(\tfrac{1}{2})(0.24(L/h)^2)/(1-0.24(L/h)^2 \epsilon_o)$$

wherein
L = length of vibrator beam 124
h = thickness of vibrator beam
$\epsilon_o$ = tension strain.

The performance point of the strain gauge is limited by the working conditions, such as, for example, the condition that the boron concentration be more than $3 \times 10^{19}$ cm⁻³. Thus, the crystal strain in vibrator 124 is limited to about 200 to 300 μ.

The device has a narrow design range because of such restricted performance point. The embodiment of FIG. 43, advantageously, solves this problem and comprises a first layer 261, consisting of an oxide or nitride film covering the surface of vibrator beam 124. A second layer 262, consisting of polysilicon, is provided covering first layer 261. A third layer 263, consisting of an oxide or nitride film, is provided covering the wall surface 132 of diaphragm 127. A fourth layer 264, consisting of polysilicon, is provided covering the surface of third layer 263. A fifth layer 265, consisting of an oxide or nitride film, is provided covering the external surface of shell 129. A sixth film 266, consisting of polysilicon, is provided covering the surface of fifth layer 265. Then, by adjusting the film thickness of first layer 261, second layer 262, the tension formed by vibrator beam 124, first layer 261, and second layer 262, is adjusted to a predetermined tension.

The embodiment of FIG. 43 is produced by the steps shown in FIGS. 44–50, as follows.

Figure 44:
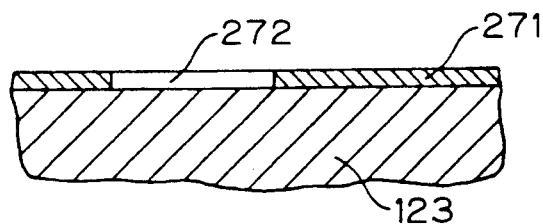
FIGS. 44-50 are diagrams depicting the procedure for producing the embodiment of FIG. 43.

1. As shown in FIG. 44, chip part 123 is cut on the (100) plane of an n type silicon, and film 271 of a silicon oxide or silicon nitride is formed thereon. A required portion 272 is removed from film 271 by photolithography.

Figure 45:
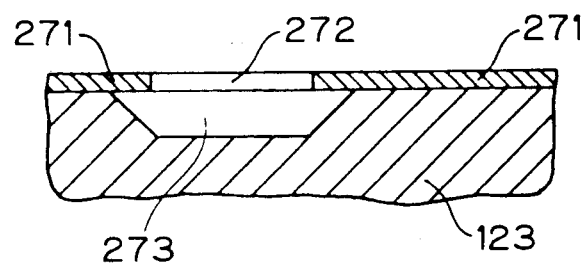

2. As shown in FIG. 45, in a hydrogen atmosphere of 1050° C., etching is carried out with hydrogen chloride, and through required portion 272 of chip part 123 to undercut film 271 and form a concave part 273. Instead of hydrogen chloride, high temperature steam and oxygen may be used. An anisotropic etching with an alkaline liquid of 40° C. to 130° C. may also be used.

Figure 46:
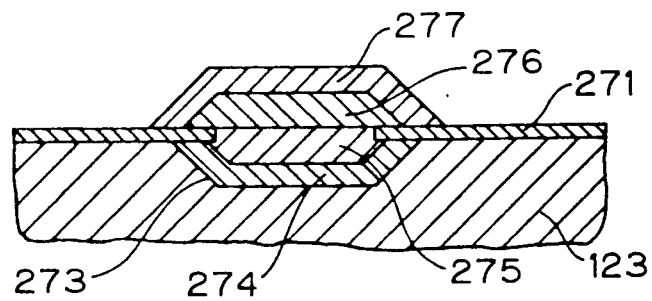

3. As shown in FIG. 46, in a hydrogen atmosphere of 1050° C., selective epitaxial growth is carried out by mixing hydrogen chloride gas with the source gas, and as follows.

A. With a p type silicon of a boron concentration of $10^{18}$ cm⁻³, first epitaxial layer 274, corresponding to the upper half of gap 131, is subjected to selective epitaxial growth.

B. With a p type silicon of a boron concentration of $3 \times 10^{19}$ cm⁻³, on the surface of first epitaxial layer 274, second epitaxial layer 275, corresponding to vibrator beam 124, is subjected to selective epitaxial growth in such a manner as to close required portion 272.

C. With a p type silicon of a boron concentration of $10^{18}$ cm⁻, the surface of second epitaxial layer 275, third epitaxial layer 276, corresponding to the lower half of gap 131, is subjected to selective epitaxial growth.

D. With a p type silicon of a boron concentration of $3 \times 10^{19}$ cm⁻³, on the surface of third epitaxial layer 276, fourth epitaxial layer 277, corresponding to shell 129, is subjected to selective epitaxial growth.

Figure 47:
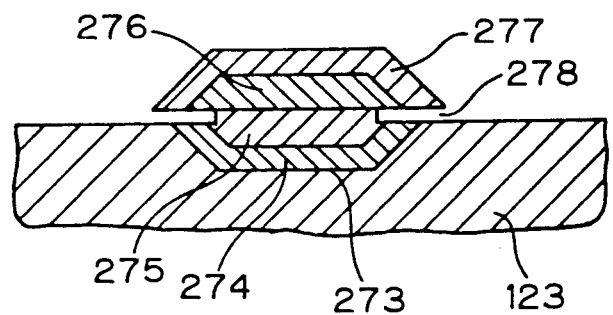

4. As shown in FIG. 47, film 271 ( see FIG. 46) of silicon oxide or silicon nitride, is removed by etching with hydrogen fluoride (HF) to provide an etching pouring inlet 278.

Figure 48:
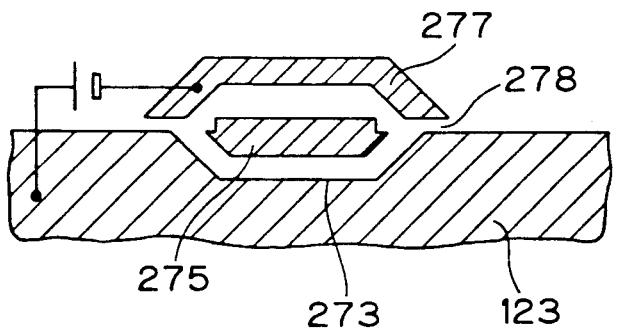

5. As shown in FIG. 48, by applying a positive pulse or a positive voltage to chip part 123 and fourth layer 277, and by pouring in an alkaline liquid through etching pouring inlet 278, first epitaxial layer 274 and third epitaxial layer 276 (see FIG. 47) are removed by selective etching.

As already discussed, difference in etching actions result from the boron concentration being $\times 10^{19}$ cm⁻³ or more.

Figure 49:
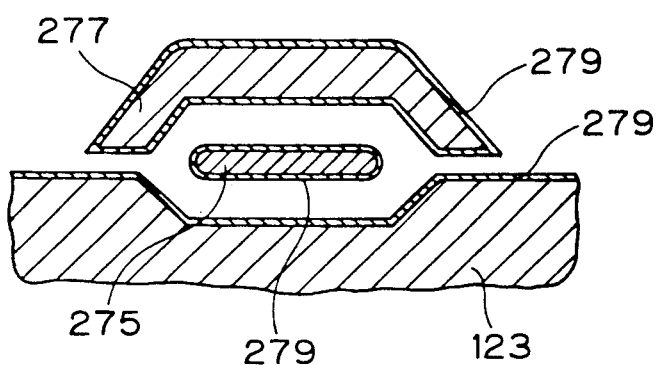

6. As shown in FIG. 49, film 279, of silicon oxide or silicon nitride, is formed on the entire body. Film 279 is of silicon oxide in this case.

Figure 50:
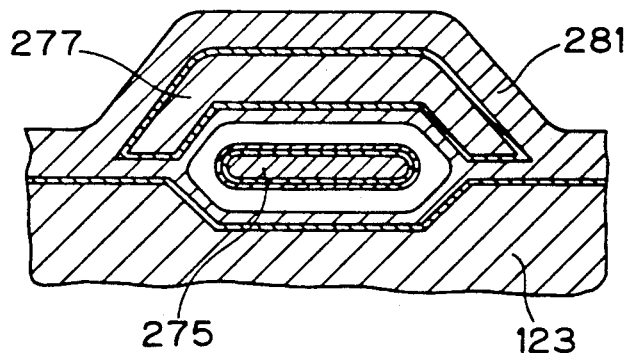

7. As shown in FIG. 50, at 950° C. and in 200 Torr pressure, and in an atmosphere comprising silane (SiH₄) of 0.3 l/min, phosphine (PH₃) of 0.0005 /min, and hydrogen of 200 l/min, a polysilicon layer 281 is formed on the surface of silicon oxide film 279, and etching pouring inlet 278 is closed. The surface roughness of polysilicon layer 281 is about 0.1 μm in pitch interval.

Then, by adjusting the film thickness of first layer 261, and second layer 262, the tension formed by vibrator beam 124, first layer 261, and second layer 262, is adjusted to the predetermined tension.

As a result, when the vibrator beam 124 is formed with silicon high boron concentration, the tension T becomes about 100 to 300 μ in dependence on the boron concentration. When first layer 261, consisting of the oxide film, is formed on vibrator beam 124, a compressive force is generated, and since tension T of first layer 261 changes with the film thickness of first layer 261, tension T of the entire concerned vibrator beam can be readily regulated.

Furthermore, when the silicon nitride film is formed as first layer 261, a tension force is generated, and since the tension of first layer 261 changes, tension T of the entire vibrator beam can be further readily regulated.

Moreover, since second layer 262, consisting of polysilicon and having a tension substantially equal to 0, has been provided on the external surface of first layer 261, tension T of the entire concerned part of vibrator beam 124, can be made to approach 0, and tension T as that of the entire concerned part of the vibrator beam can be more easily regulated.

Figure 51:
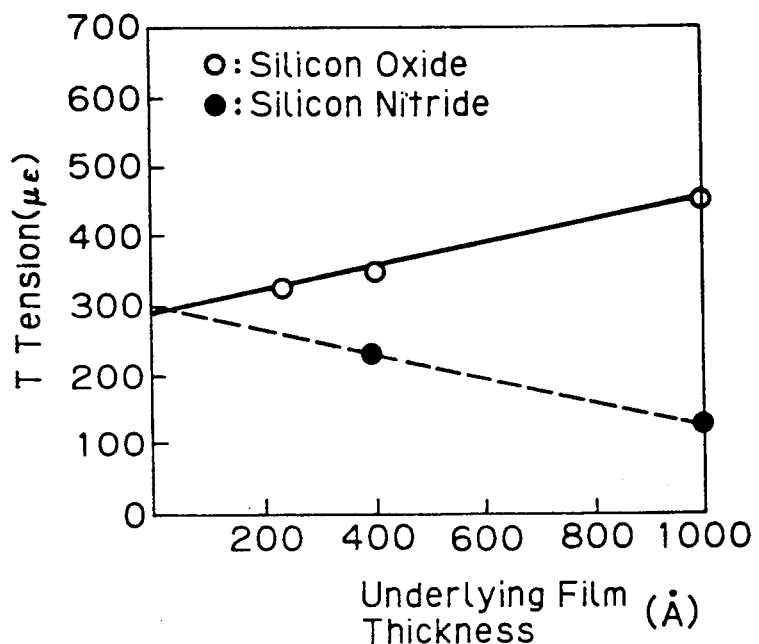
FIG. 51 is a diagram for explaining the embodiment of FIG. 43.

FIG. 51 shows the relationship between the silicon oxide film thickness A, the nitride film thickness B, and the temperature coefficient $\alpha$ is shown, wherein thickness of film A is represented by a white circle, and the thickness of film B is represented by a black circle In an extension of the graph, when silicon nitride film B is 2000 Å, the total thickness becomes about 700 $\mu$.

Figure 52:
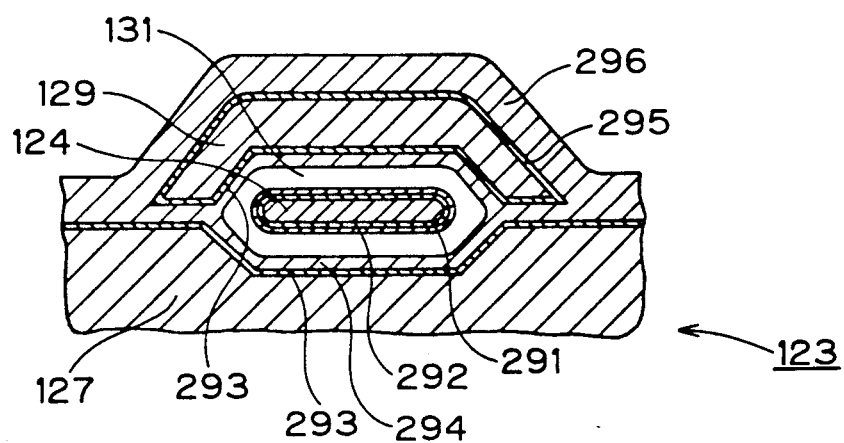
FIG. 52 is a diagram depicting an important part of yet another illustrative embodiment of the invention.

When the surface of vibrator beam 124 is covered with second layer 262, consisting of polysilicon and having a rough surface, vibrator 124 is prevented from adhering to the wall surface of shell 129, and reliability is substantially improved FIG. 52 depicts another illustrative vibrating beam, wherein the same symbols as those in FIG. 8 represent the same elements. As background material, and in general, the temperature coefficient of the natural frequency of silicon vibrator beam 124 is −30 to 40 ppm/K. This is the value obtained from the physical values. Under such condition, the temperature coefficient is too large for use of the device in a sensor requiring high precision. Desire for stability of temperature would require use of temperature correction. As a result, the device becomes expensive, and furthermore, the entire stability of the entire device is adversely influenced by the stability of the temperature sensor. The embodiment of FIG. 52 intends to solve this problem.

In FIG. 52, a first layer 291, consisting of an oxide or nitride film, is provided covering the surface of vibrator beam 124. A second layer 292, consisting of polysilicon, is provided covering the surface of first layer 291. A third layer 293, consisting of oxide or nitride, is provided covering the wall surface 132 of diaphragm 127. A fourth layer 294, consisting of polysilicon, is provided covering the surface of the third layer. A fifth layer 295, consisting of oxide or nitride film, is provided covering the external surface of shell 129. A sixth layer 296, consisting of polysilicon, is provided covering the surface of fifth layer 295. The film thickness of first layer 291 and second layer 292 are adjusted so that the temperature coefficient of the vibrator beam 124, first layer 291, and second layer 292, is adjusted to a predetermined temperature coefficient.

The embodiment of FIG. 52 is produced by the steps described in FIGS. 53-59, as follows.

Figure 53:
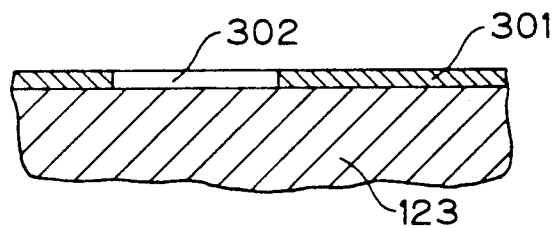
FIGS. 53-59 are diagrams depicting the procedure for producing the embodiment of FIG. 52.

1. As shown in FIG. 53, on chip part 123, which is cut on the (100) plane of n type silicon, is formed film 301 of silicon oxide or silicon nitride. A required portion 302 is removed from film 301 by photolithography.

Figure 54:
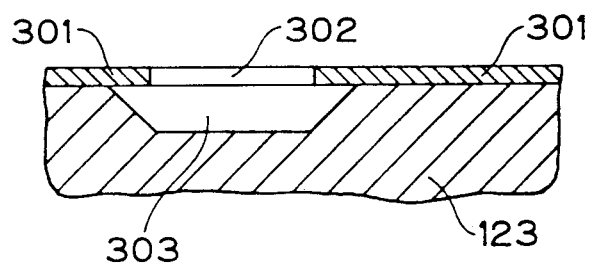

2. As shown in FIG. 54, in an atmosphere of hydrogen, of 1050° C., etching is carried out using hydrogen chloride. A concave part 303 is formed by etching through required portion 302 in chip part 123 and by undercutting film 301. Instead of hydrogen chloride, high temperature steam and oxygen may be used. Also, anisotropic etching with an alkaline liquid of 40° to 130° C. may be used.

Figure 55:
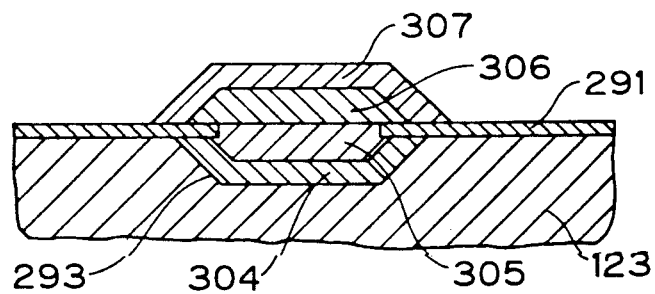

3. As shown in FIG. 55, in any atmosphere of hydrogen of 1050° C., selective epitaxial growth is carried out as follows.

A. With a p type silicon of a boron concentration of $10^{18}$ cm$^{-3}$, first epitaxial layer 304, corresponding to the upper half of gap 131, is subjected to selective epitaxial growth.

B. With a p type silicon of a boron concentration of $3 \times 10^{19}$ cm$^{-3}$, on the surface of first epitaxial layer 304, second epitaxial layer 302, corresponding to vibrator beam 124, is subjected to selective epitaxial growth.

C. With a p type silicon of a boron concentration of $10^{18}$ cm$^{-3}$, on the surface of second epitaxial layer 305, third epitaxial layer 306, corresponding to the lower half of gap 131, is subjected to selective epitaxial growth.

D. With a p type silicon of a boron concentration of $3 \times 10^{19}$ cm$^{-3}$, on the surface of third epitaxial layer 306, fourth epitaxial layer 307, is subjected to selective epitaxial growth.

Figure 56:
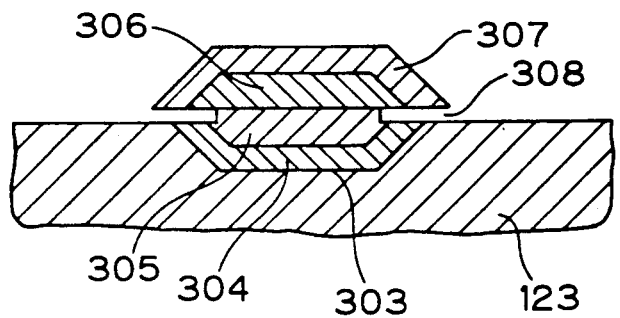

4. As shown in FIG. 56, film 301, of silicon oxide or silicon nitride, is removed by etching with hydrogen fluoride acid (HF) to provide etching pouring inlet 308.

Figure 57:
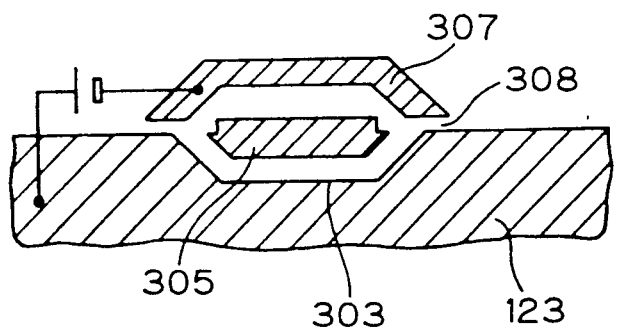

5. As shown in FIG. 57, by applying a positive pulse or a positive voltage to chip part 123 and fourth layer 307, and by pouring in an alkaline liquid through etching pouring inlet 308, first epitaxial layer 304 (see FIG. 56) and third epitaxial layer 306 (see FIG. 56) are removed by selective etching.

As above discussed, there are differences in etching actions due to suppression when the boron concentration is $3 \times 10^{19}$ cm$^{-3}$ or more.

Figure 58:
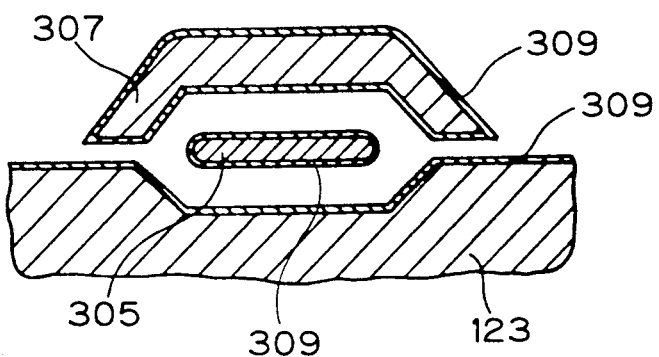

6. As shown in FIG. 58, film 309 of silicon oxide or silicon nitride is formed on the entire body. In this case, the film 309 is of silicon oxide.

Figure 59:
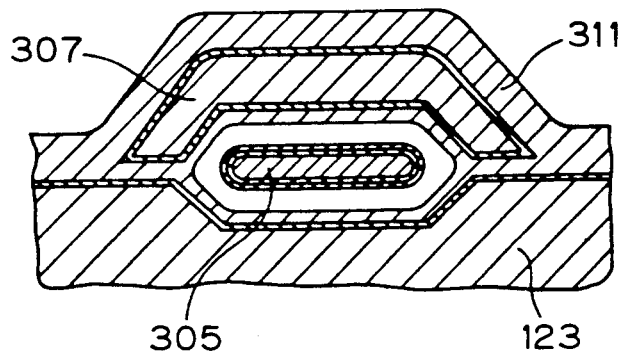

7. As shown in FIG. 59, at 950° C. in 200 Torr pressure, in an atmosphere of silane (SiH$_4$) of 0.3 l/min, phosphine (PH$_3$) of 0.0005 l/min, and hydrogen of 200 l/min, polysilicon layer 311 is formed on the surface of silicon oxide film 309, and etching pouring inlet 308 is closed. The surface roughness of the polysilicon layer 311 is about 0.1 $\mu$m in pitch interval.

Then, by adjusting the film thickness of first layer 291, and second layer 292, the temperature coefficient of the combination of vibrator beam 124, first layer 291, and second layer 292, is adjusted to a predetermined temperature coefficient.

As a result, in the case when the vibrator beam 124 is produced with silicon of high boron concentration, the temperature coefficient $\alpha$ is determined by the boron concentration. When first layer 291 is formed of silicon dioxide, since the temperature coefficient thereof changes with film thickness, the temperature coefficient of the entire vibrator beam can be regulated to be 0.

Even if the film is formed of silicon nitride, since the temperature coefficient of the first layer 291 changes with film thickness, the temperature coefficient of the entire vibrator beam can be regulated to be 0.

Further since second layer 292, consisting of polysilicon, is provided on the external surface of first layer 291, it is more easily regulated so that the temperature coefficient of the entire vibrator beam is made to be 0.

FIG. 60 shows the relationship between silicon oxide film thickness A, silicon nitride film thickness B, and temperature coefficient $\alpha$ when the thickness of vibrator beam 124 is 3.5 $\mu$m, and the thickness of the second layer 292 is 1/$\mu$m. Thickness A is represented by a white circle, and thickness B is represented by a black circle.

In the above embodiment, although fifth layer 295 is described as consisting of an oxide or nitride film covering the external surface of shell 129 and sixth layer 296 is described as consisting of polysilicon covering the surface of fifth layer 295, the invention is not so limited. For example, the epitaxial growth layer may consist of a silicon single layer provided by removing fifth layer 295. In effect, it suffices to utilize any suitable method to seal vibrator 124.

The foregoing description is illustrative of the principles of the invention. Numerous modifications and extensions thereof would be apparent to the worker skilled in the art. All such modifications and extensions are to be considered to be within the spirit and scope of the invention.

What is claimed is:

1. In a vibrating type pressure measuring device for measuring pressure by utilizing changes of the natural frequency of a vibrator beam of a sensor part in correspondence to changes of axial force of the vibrator beam, wherein said sensor part comprises a housing part having an internal vacant space;

a supporting body provided in said internal vacant space;

a silicon substrate supported at one surface thereof by said supporting body;

a silicon chip comprising a diaphragm with a concave part and forming a first measuring chamber with said substrate;

a silicon vibrator beam provided in said diaphragm with a gap kept in vacuum and having an H shape with a tip part thereof fixed to said diaphragm;

a DC magnetic field applying means forming a second measuring chamber with said sensor part, and for applying DC magnetic field to said vibrator beam, said DC magnetic field applying means comprising a spacer fixed at one surface thereof to said housing and provided in the circumference of said supporting body, said substrate, and said chip, a permanent magnet arranged in opposition to said vibrator mean, a yoke for holding said permanent magnet with one surface approaching said diaphragm to constitute a narrow gap with said diaphragm, and a yoke holder for holding said yoke and fixed to said spacer; and a charging liquid charged in said second measuring chamber.

2. The device of claim 1, wherein said diaphragm has a rough or uneven surface, or said vibrator beam has a rough or uneven surface.

3. The device of claim 1, wherein said vibrator beam is covered by a first layer consisting of oxide or nitride film;

a second layer consisting of polysilicon having a rough or uneven surface covers the surface of said first layer;

wherein said first measuring chamber has its internal surface covered by a third layer consisting of an oxide or nitride film;

a fourth layer consisting of polysilicon covers the surface of said third layer;

wherein a part of said chip is covered by a fifth layer consisting of silicon oxide film or silicon nitride film; and a sixth layer consisting of polysilicon covers the surface of said fifth layer.

4. The device of claim 1, wherein said vibrator beam is covered with a first layer consisting of an oxide or nitride film;

a second layer consisting of polysilicon covers the surface of said first layer;

wherein said first measuring chamber has its internal surface covered with a third layer consisting of an oxide or nitride film;

a fourth layer consisting of polysilicon covers the surface of said third layer; and wherein said housing is covered with a seventh layer consisting of a silicon single crystal.

5. The device of claim 1, wherein said vibrator beam is covered with a first layer consisting of an oxide or nitride film;

a second layer consisting of polysilicon covers the surface of said first layer;

wherein said first measuring chamber has its internal surface covered with a third layer consisting of an oxide or nitride film;

a fourth layer consisting of polysilicon covers the surface of said third layer; and wherein the film thickness of said first and second layers are adjusted so that the tension formed by said vibrator beam, said first layer and said second layer, is adjusted to a predetermined tension.

6. The device of claim 1, wherein said vibrator beam is covered with a first layer consisting of an oxide or nitride film;

a second layer consisting of polysilicon covers the surface of said first layer;

wherein said first measuring chamber has its internal surface covered with a third layer consisting of an oxide or nitride film;

a fourth layer consisting of polysilicon covers said third layer; and wherein the film thicknesses of said first and second layers are adjusted so that the temperature coefficient of the combination of said vibrator beam, said first layer and said second layer is at a predetermined temperature coefficient.

* * * * *